April 5, 1955  P. S. McKIBBEN ET AL  2,705,614
POWER OPERATED PIPE TONGS
Filed May 7, 1949  15 Sheets-Sheet 1

PAUL S. McKIBBEN
JOHN L. CHRISMAN
JAMES M. SMITH
INVENTORS

BY Lyon&Lyon
ATTORNEYS

April 5, 1955

P. S. McKIBBEN ET AL 2,705,614

POWER OPERATED PIPE TONGS

Filed May 7, 1949

PAUL S. McKIBBEN
JOHN L. CHRISMAN
JAMES M. SMITH
INVENTORS

BY Lyon & Lyon

ATTORNEYS

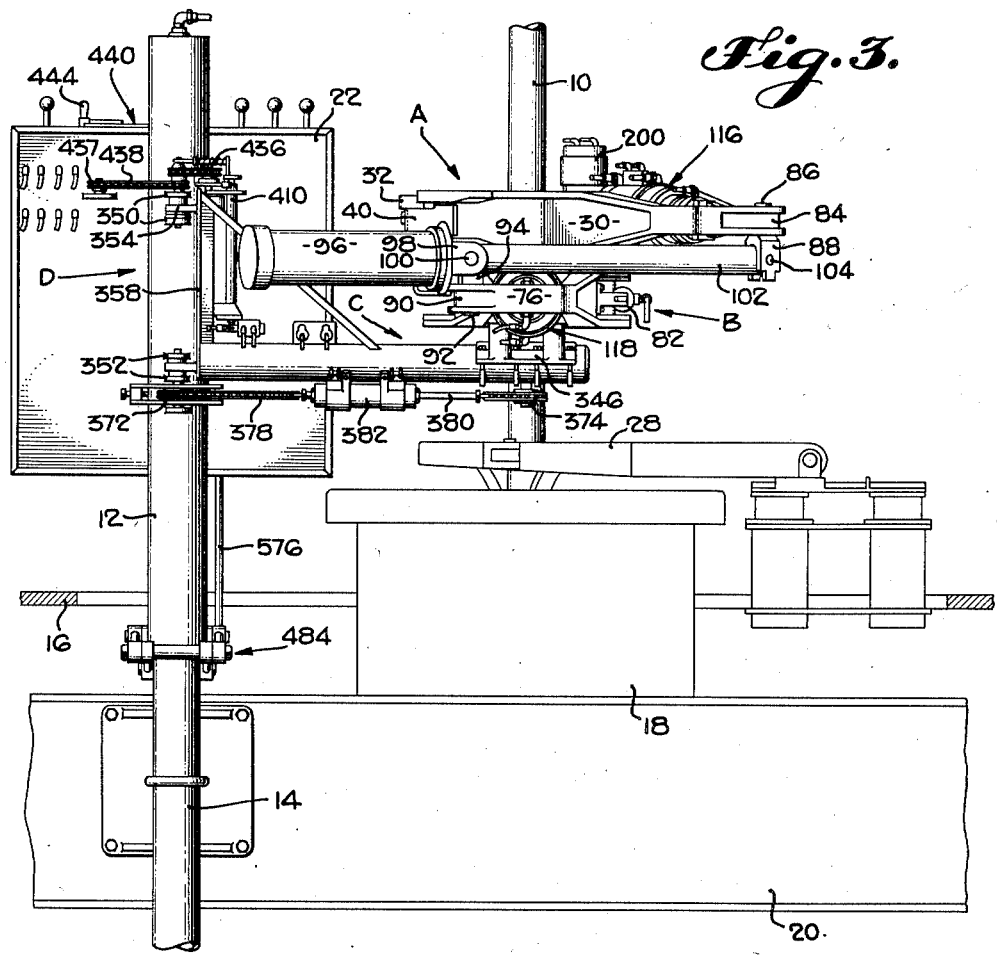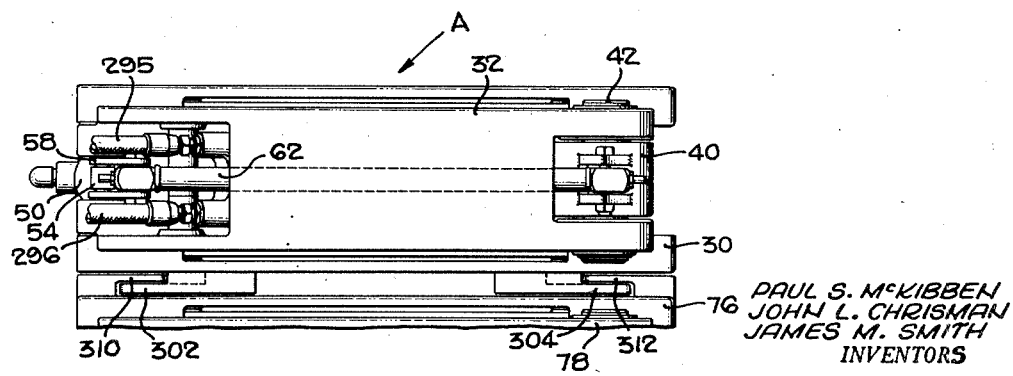

PAUL S. McKIBBEN
JOHN L. CHRISMAN
JAMES M. SMITH
INVENTORS

BY Lyon & Lyon
ATTORNEYS

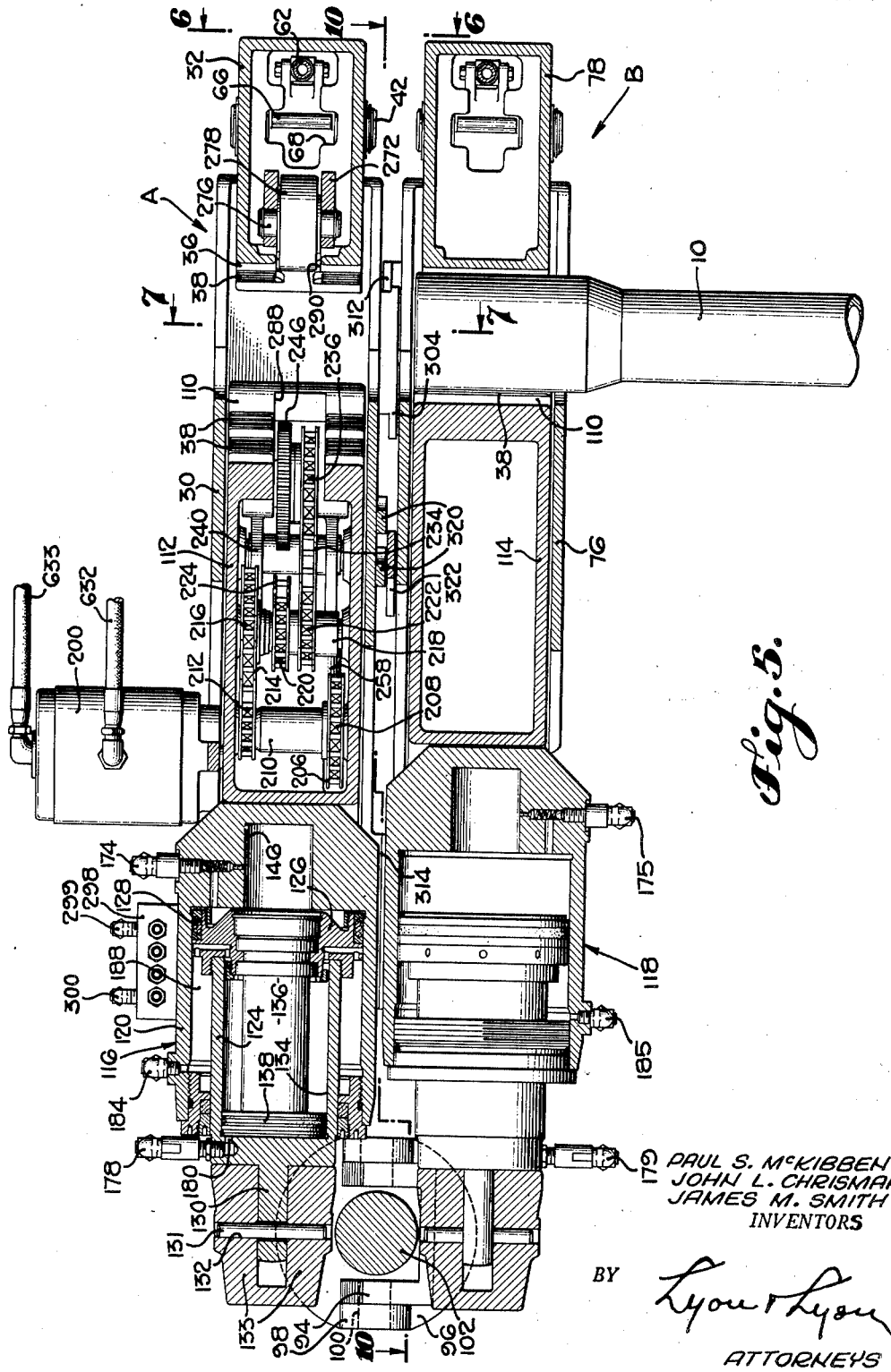

PAUL S. McKIBBEN
JOHN L. CHRISMAN
JAMES M. SMITH
INVENTORS

BY Lyon & Lyon
ATTORNEYS

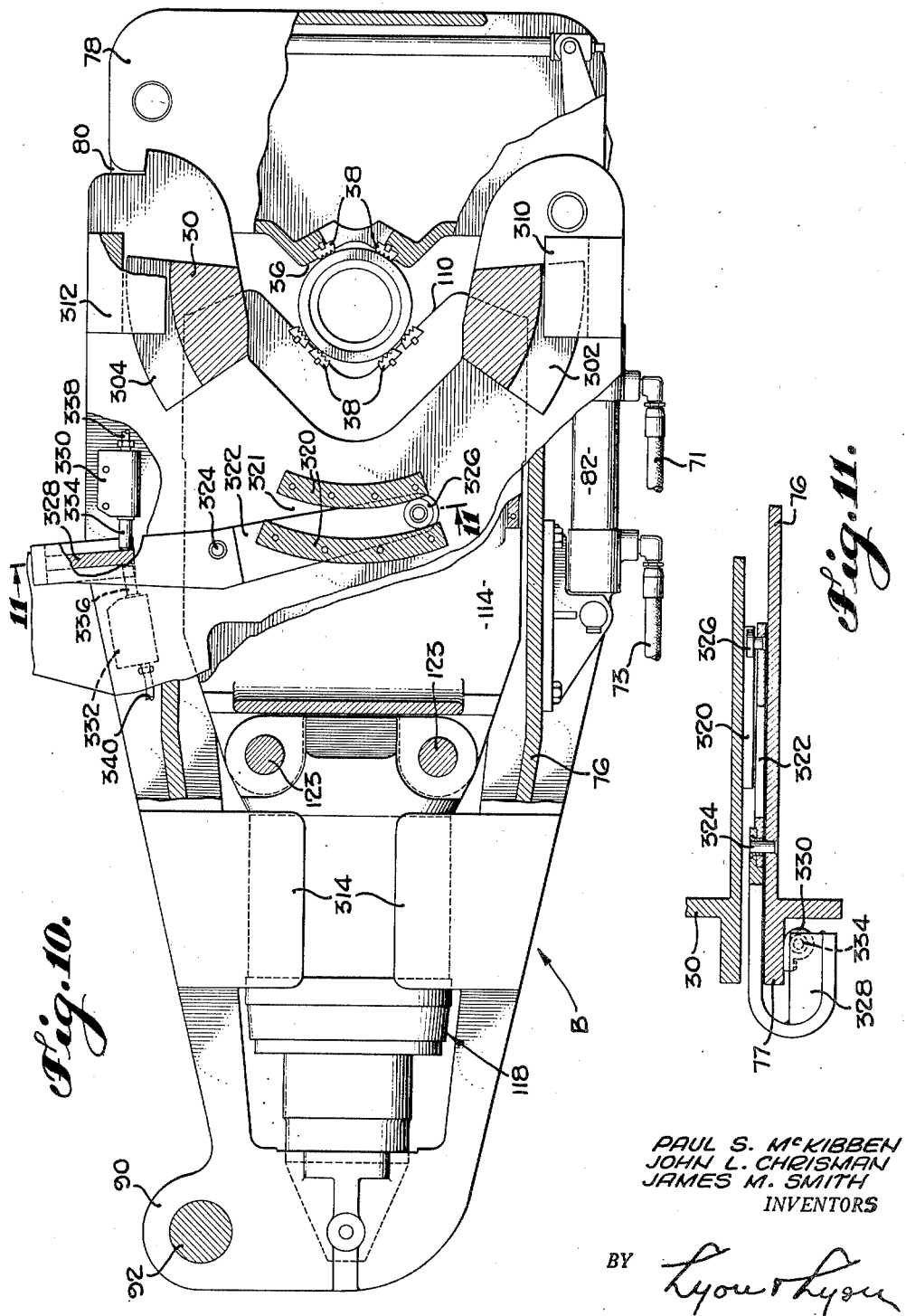

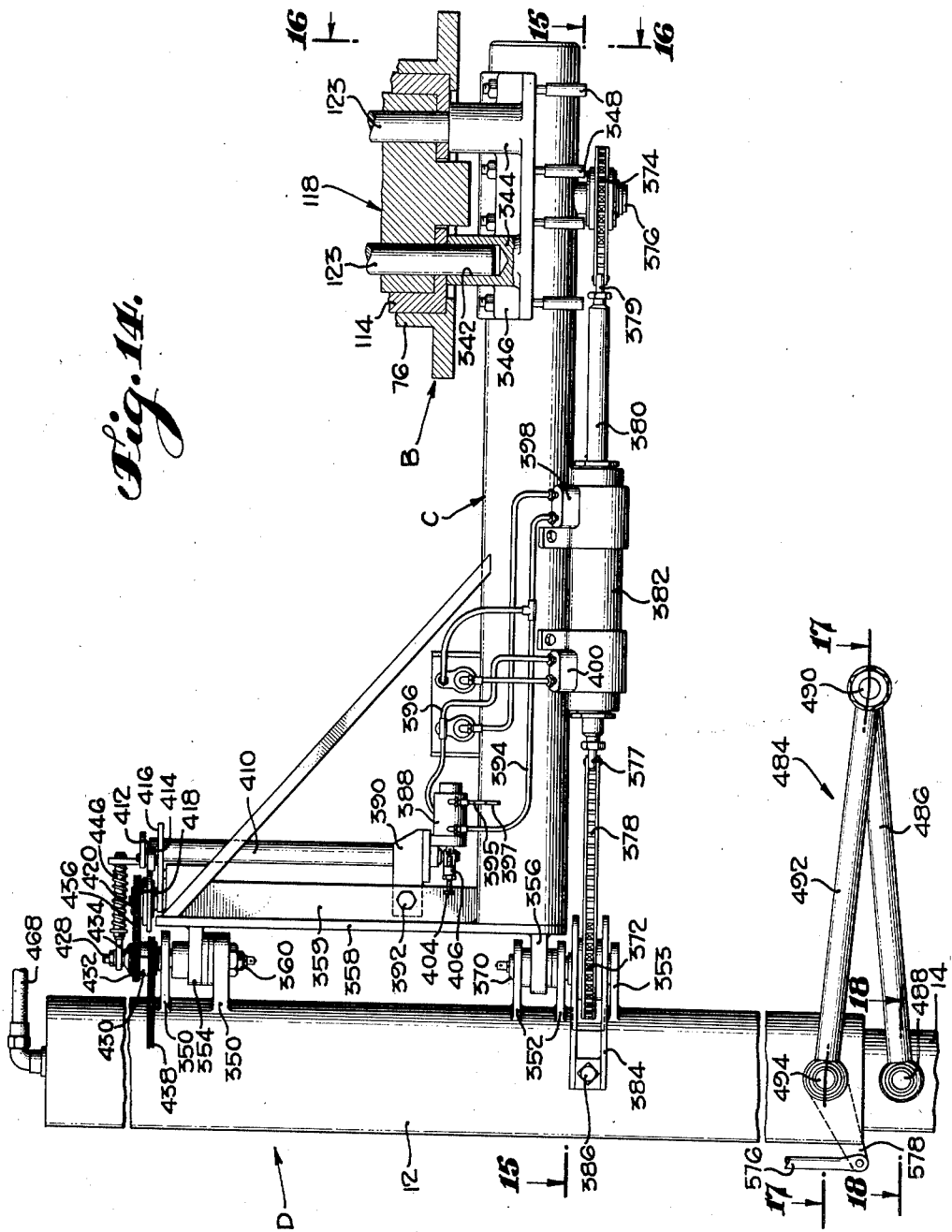

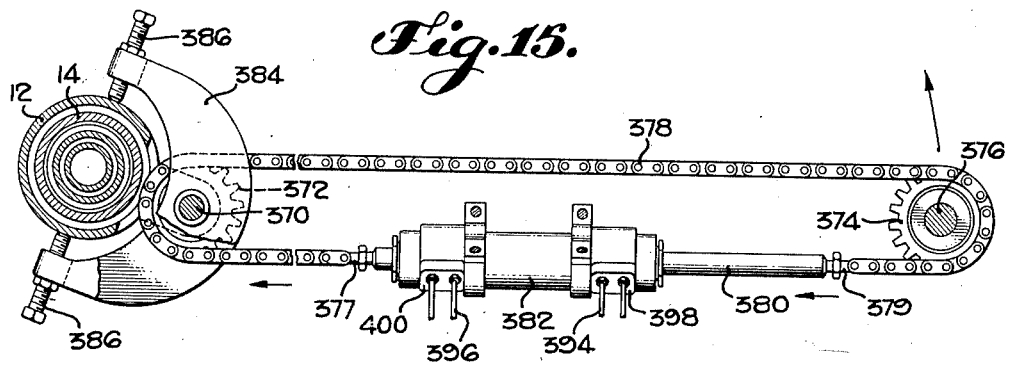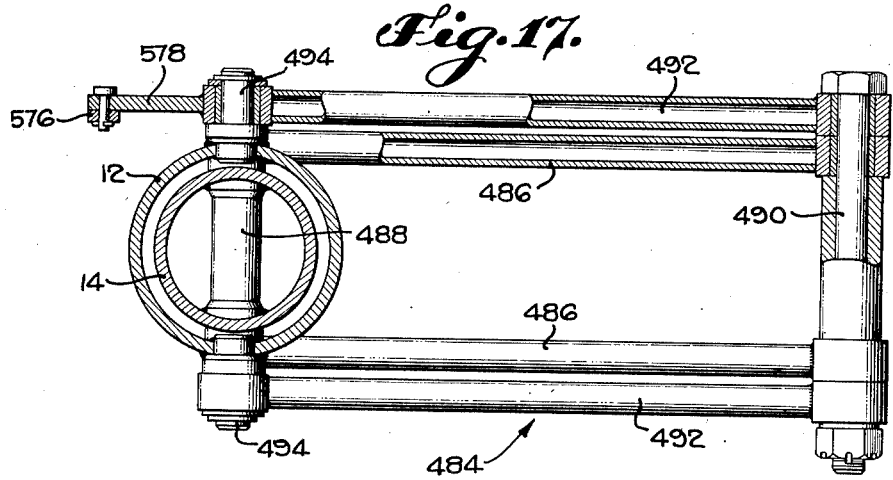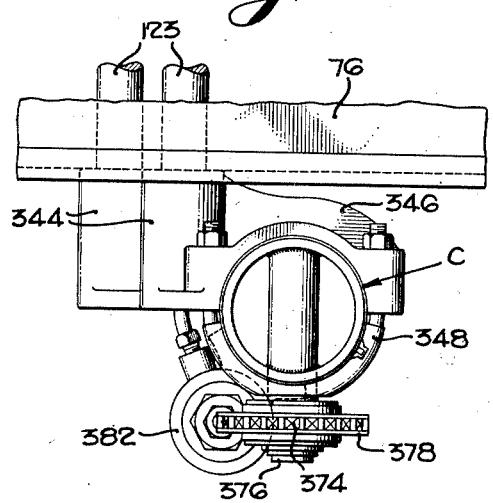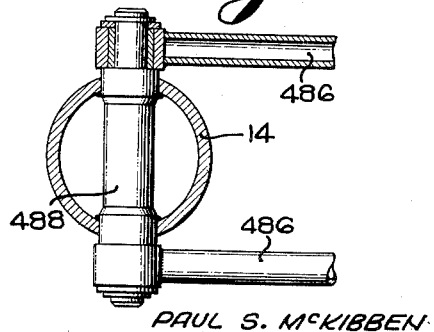

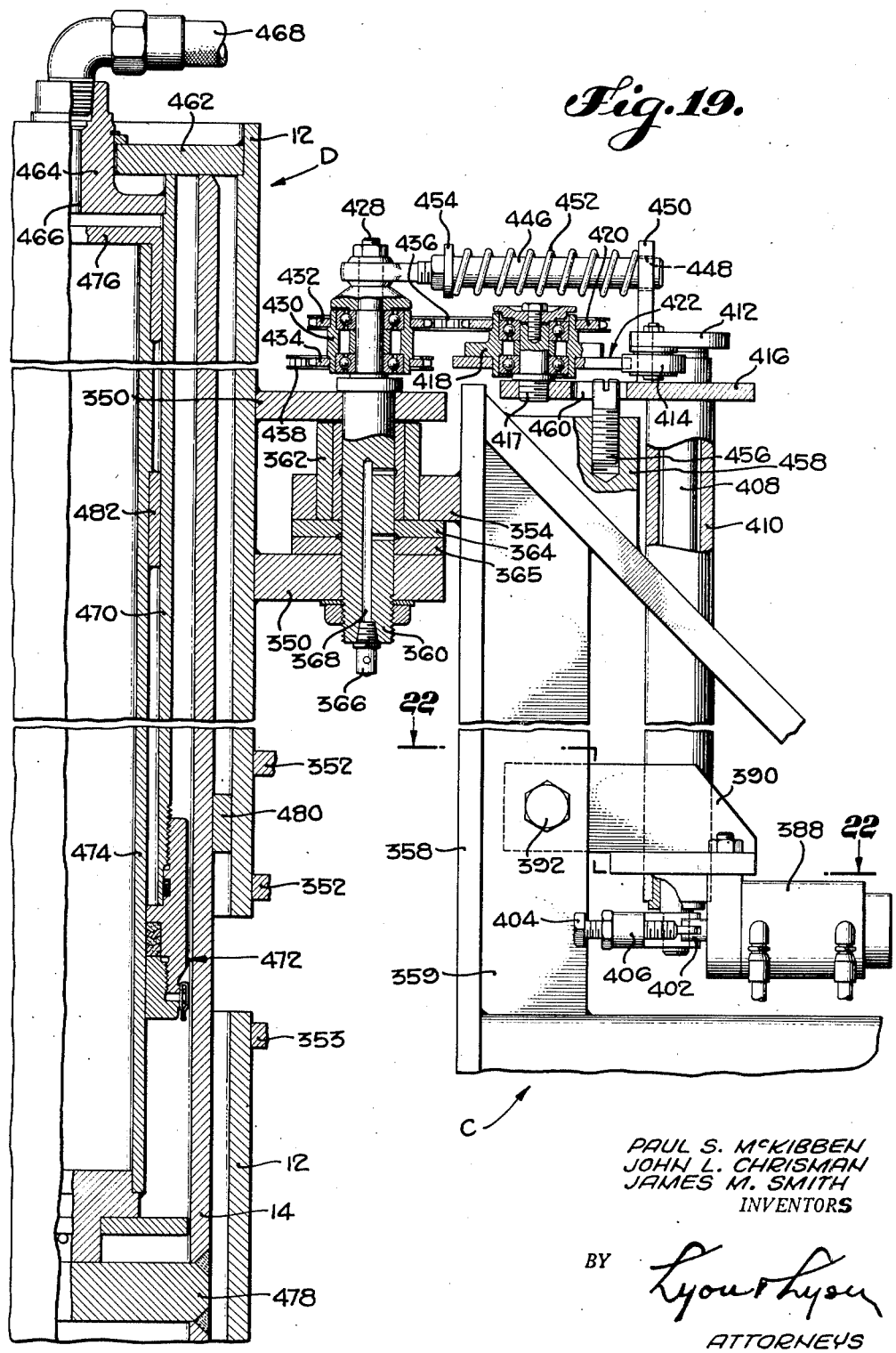

April 5, 1955   P. S. McKIBBEN ET AL   2,705,614
POWER OPERATED PIPE TONGS
Filed May 7, 1949   15 Sheets-Sheet 12
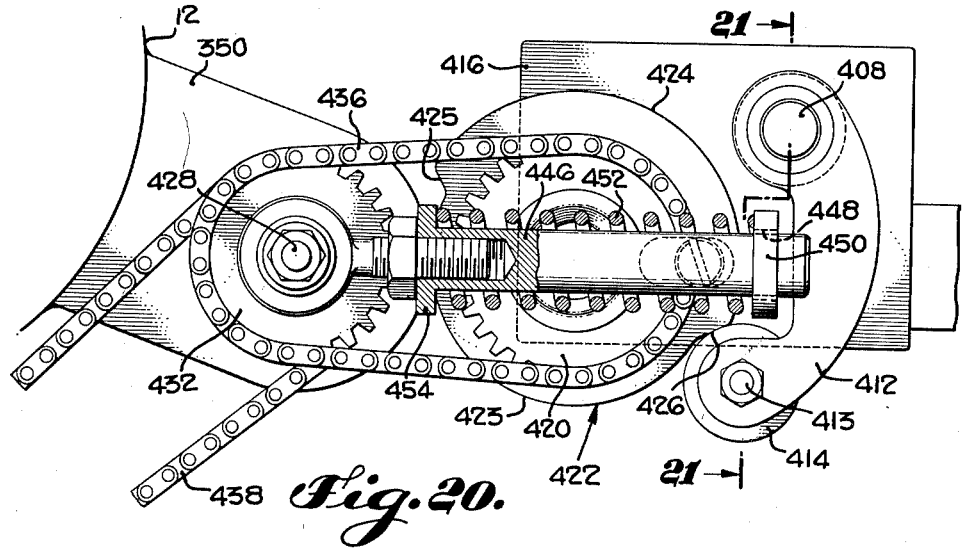
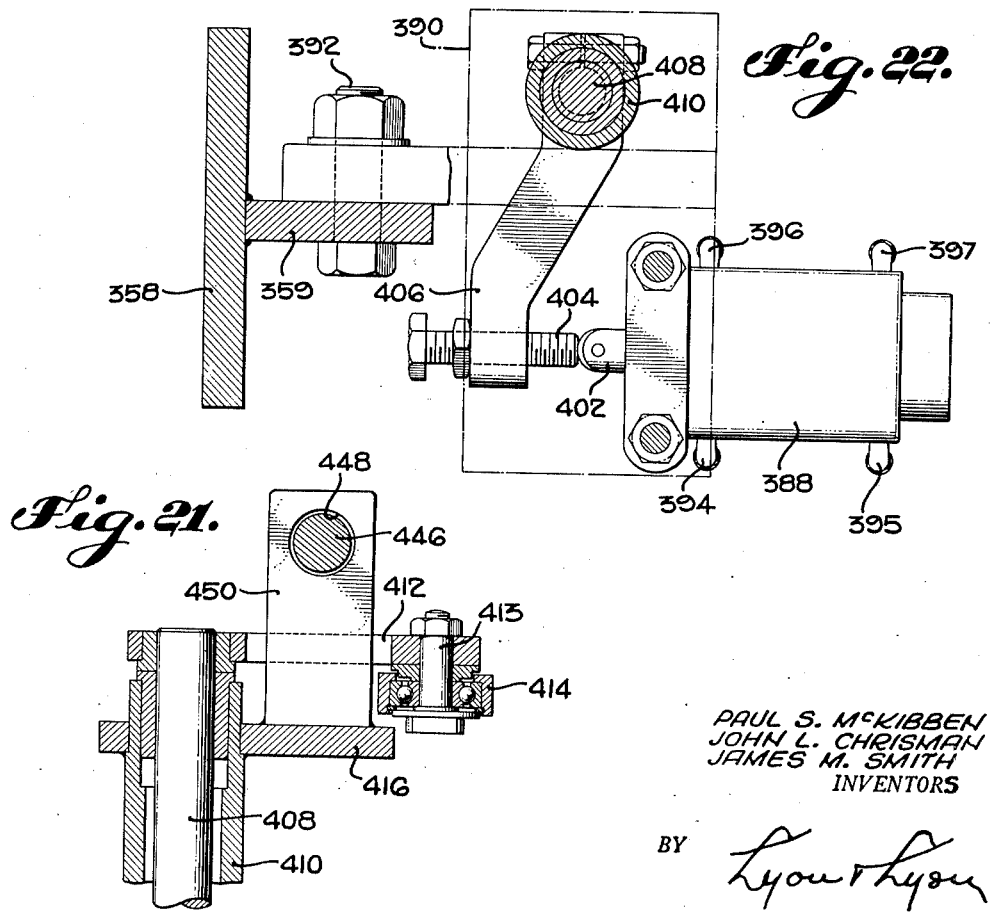
PAUL S. McKIBBEN
JOHN L. CHRISMAN
JAMES M. SMITH
INVENTORS
BY
ATTORNEYS April 5, 1955  P. S. McKIBBEN ET AL  2,705,614
POWER OPERATED PIPE TONGS
Filed May 7, 1949  15 Sheets-Sheet 13
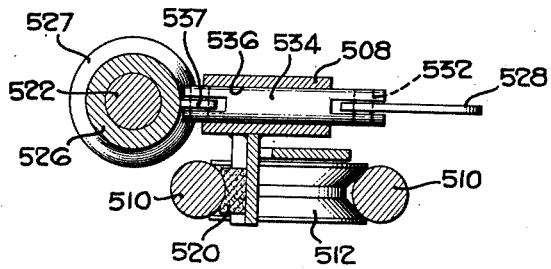
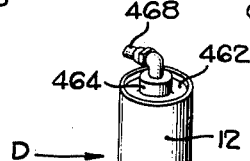
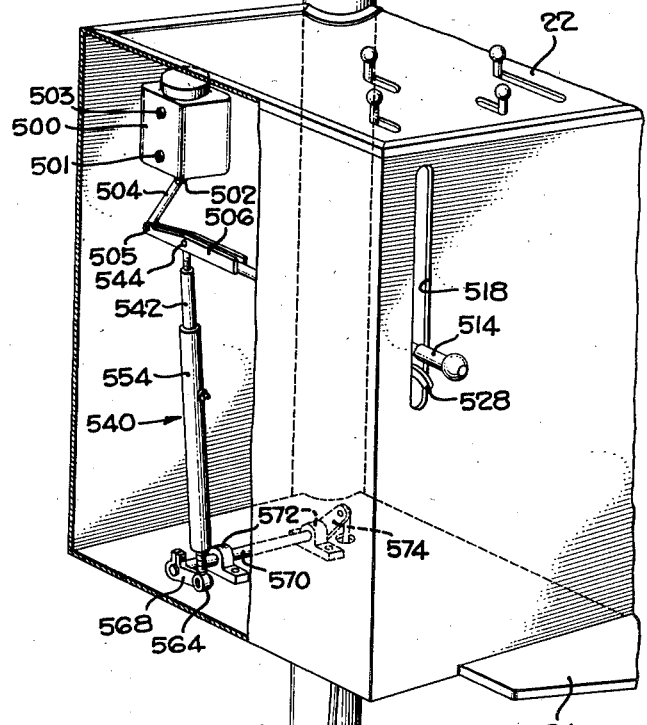
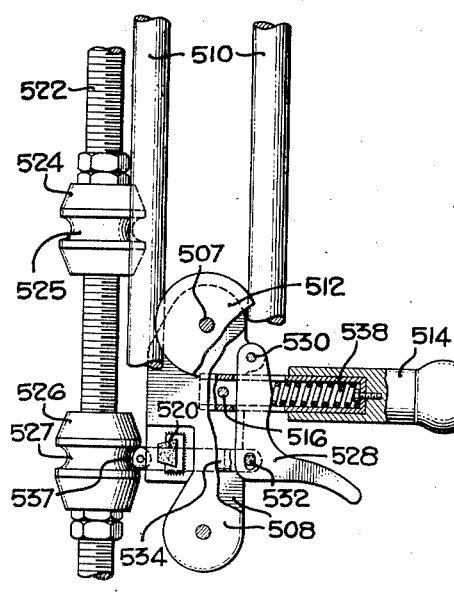
PAUL S. McKIBBEN
JOHN L. CHRISMAN
JAMES M. SMITH
INVENTORS
BY Lyon & Lyon
ATTORNEYS

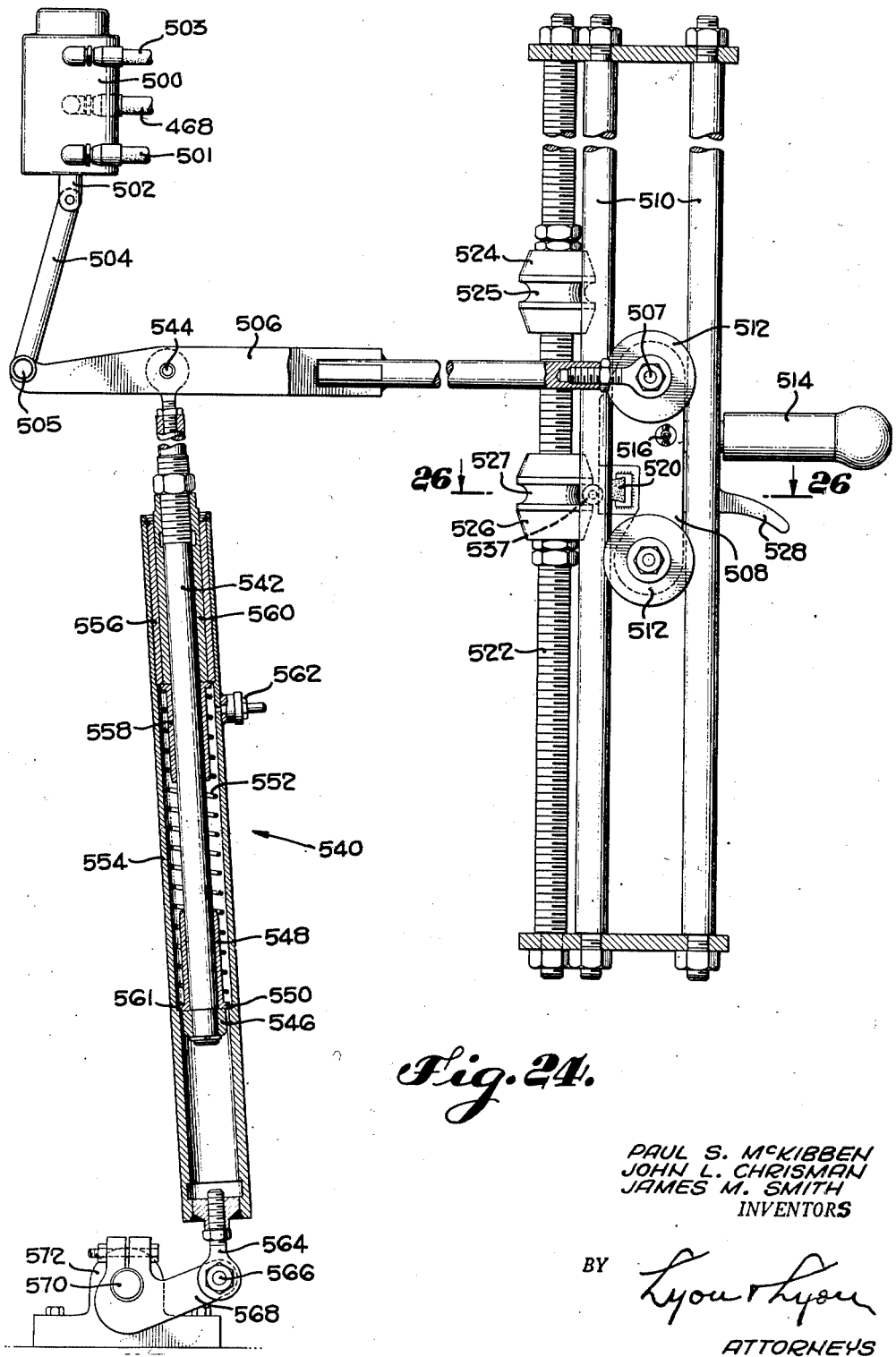

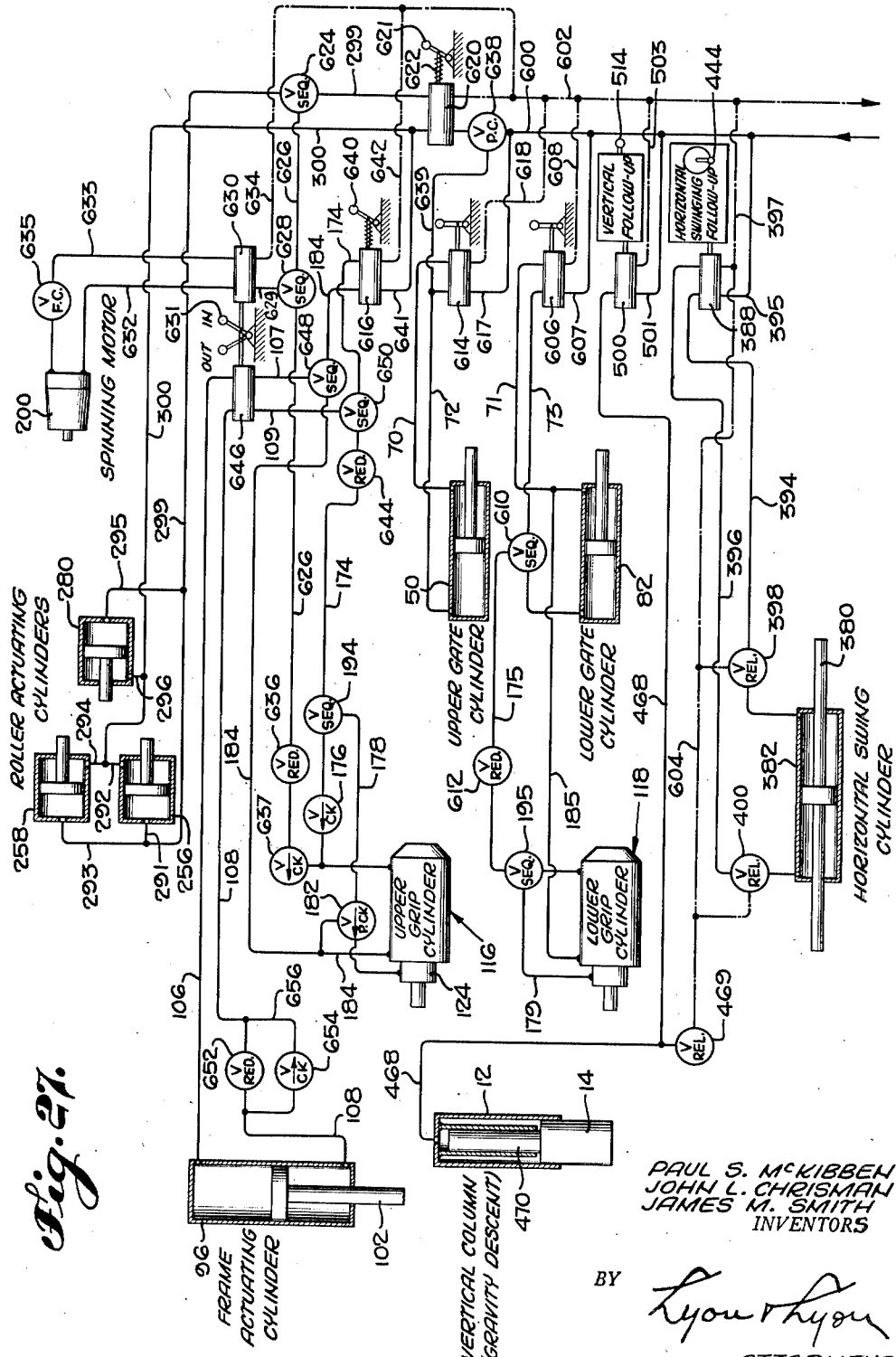

United States Patent Office 2,705,614
Patented Apr. 5, 1955

2,705,614
POWER OPERATED PIPE TONGS

Paul S. McKibben, Temple City, John L. Chrisman, Los Angeles, and James M. Smith, Mariposa, Calif., assignors to Byron Jackson Co., Vernon, Calif., a corporation of Delaware Application May 7, 1949, Serial No. 92,046

31 Claims. (Cl. 255—35)

This invention relates generally to pipe tongs, and particularly to power-operated pipe tongs especially adapted for use in making up and breaking out joints in a string of drill pipe.

In the drilling of deep wells by the rotary method, utilizing a string of sectional drill pipe, the task of removing the drill string from the well to replace a worn drill bit involves breaking out the drill string by "stands," each stand being usually 60, 90 or 120 feet in length, depending on the height of the derrick. After replacing the worn bit by a sharp one, the drill string is run back into the well, stand by stand. The operation of breaking out and making up the threadedly connected stands is an arduous, time-consuming and hazardous task. The use of manually manipulated make-up and breakout tongs, and of a spinning rope or chain for spinning up the joints, not only imposes a heavy burden of manual labor on the crew members because of the weight of the equipment, but is also very hazardous.

It has been generally recognized for some time that the labor burden and the physical hazards involved in the operation of pulling out and running in a string of drill pipe could be alleviated to a great extent by the use of tong equipment which is both actuated and manipulated by power. However, so far as applicants are aware, no practical tong equipment of this type has heretofore been developed. Previous attempts have failed for various reasons to produce such equipment in a form acceptable to the well drilling industry. One of the principal reasons for the lack of acceptance of previously developed equipment of this type is that it slowed down the operation. Another reason is that such equipment was not wholly dependable and could not be relied on to function properly at all times, under the unusually severe service conditions to which such equipment is subjected.

The foregoing and other disadvantages of power actuated and manipulated tongs have been eliminated by the present invention, which has resulted in the development of tong equipment which is operated and manipulated entirely by power means under the control of a single operator at a station sufficiently remote from the well bore to be safe and at the same time in full view of the operation. In a preferred embodiment of the invention, hydraulically actuated devices are employed to perform all operations and manipulations, and by the use of suitable and effective controls, interlocks and sequencing devices it has been possible to achieve more rapid operation than has been possible with existing equipment, not only in a safe and dependable manner but also without imposing an undue burden of mental alertness or manual dexterity on the single operator. It has been found possible to train an average member of a drilling crew to skillfully operate tong equipment embodying the instant invention.

In general, a preferred embodiment of the invention comprises a pair of superimposed tong structures suitably supported for vertical and lateral movement, such as by being mounted on a horizontal arm carried by and swingable horizontally relative to a vertically adjustable section of an extensible column. The tong structures are preferably inter-connected for relative oscillation about the axis of a drill pipe tool joint to which they may be applied, there being a hydraulic actuator interconnecting the outer extremities of the tong structures to effect such relative oscillation. Each tong structure preferably includes hydraulically actuated devices for gripping the respective sections of the tool joint, and the upper tong structure preferably also includes a hydraulically actuated spinning device for spinning the joint sections together or apart. All of the hydraulic devices are actuated by fluid pressure from a common source, and are controlled either by automatic sequencing valves, by automatic follow-up mechanisms, or by manually manipulated valves conveniently located at the operator's station, all as hereinafter described in detail.

A general object of this invention is to provide a completely unitized, power-actuated pipe tong assembly which is practical, dependable, simple to operate and which eliminates the hazards and labor involved in operating tongs heretofore in general use.

Another object of this invention is to provide improved means for mounting a pipe tong assembly of the foregoing type on a drilling rig, and for manipulating it between different operating and inactive positions.

Still another object of this invention is to provide a pipe tong structure embodying improved pipe gripping means.

Yet another object of this invention is to provide a pipe tong structure having incorporated therein improved pipe spinning mechanism embodying novel and improved means for manipulating the spinning device or devices between operative and inactive positions.

A still further object of this invention is to provide an improved mounting and interconnection between a pair of superposed tong structures, permitting relative oscillation thereof about different axes spaced apart longitudinally of the respective tong structures, and incorporating means for automatically re-centering the tong structures after each tonging operation.

A still further object of this invention is to provide a tong structure embodying novel and improved gate and latch mechanism.

A still further object of this invention is to provide improved means for mounting a tong assembly and for elevating and lowering it into different vertically spaced positions and to provide control mechanism operable automatically to de-energize the said elevating and lowering means when the tong assembly assumes a preselected position.

A still further object of this invention is to provide improved means for mounting a tong assembly and for moving it between laterally spaced positions and to provide control mechanism operable automatically to stop the lateral movement when the tong assembly assumes a preselected position.

Yet another object of this invention is to provide a system of valves and other control devices for controlling the operation and manipulation of a power-actuated tong assembly, which system is so designed as to (a) reduce to a minimum the number of manual controls, (b) eliminate the possibility of improper operation, (c) afford rapid operation by eliminating lost time between sequential operations, and (d) in general insure satisfactory and dependable operation of all component parts of the device.

Other objects and advantages of the present invention will become apparent from the following detailed description of what is now considered a preferred embodiment thereof, reference being had to the accompanying drawings wherein:

Figure 3 is a side elevation of the tong assembly as viewed in the direction of the arrow 3 of Figure 2;

Figure 5 is a vertical longitudinal sectional view through both tong structures when in directly superposed relation, taken substantially on line 5—5 of Figure 4;

Figure 6 is a view in end elevation of the upper tong structure, taken on line 6—6 of Figure 5;

Figure 10 is a top plan view of the lower tong structure, taken substantially on line 10—10 of Figure 5 and illustrating in particular the re-centering mechanism between the two tong structures;

Figure 11 is a transverse sectional view taken on line 11—11 of Figure 10;

Figure 14 is a view in side elevation of the column and arm which support the tong structures, as viewed in the direction of the arrow 14 in Figure 1;

Figure 15 is a horizontal sectional view taken on line 15—15 of Figure 14;

Figure 16 is an end view of the arm and associated parts, taken on line 16—16 of Figure 14;

Figure 1:
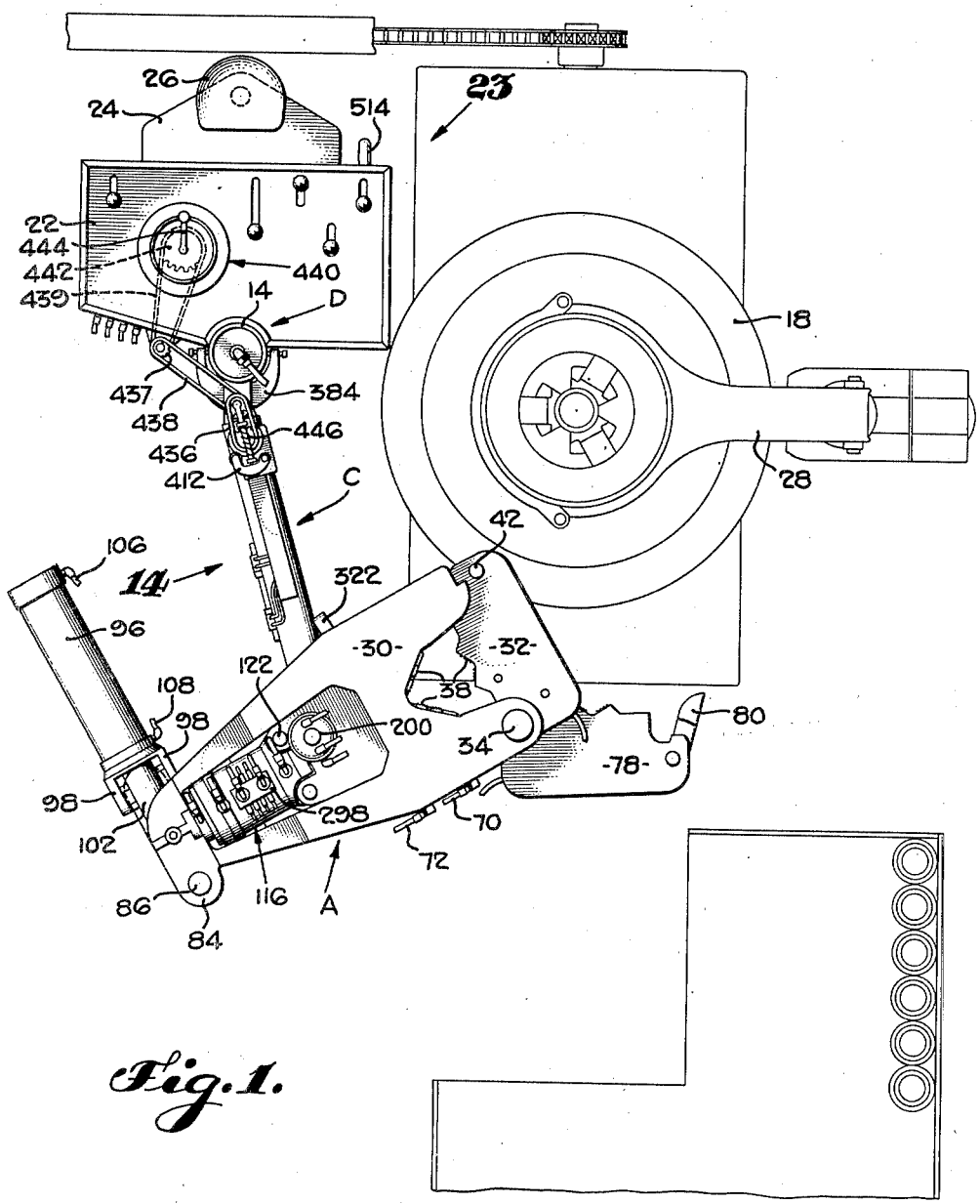
Figure 1 is a top plan view of a tong assembly embodying the instant invention, mounted in a drilling rig and disposed in an inactive position, with the gate of the upper tong structure closed and that of the lower tong structure in open position.

Figures 17 and 18 are sectional views taken on lines 17—17 and 18—18 respectively of Figure 14;

Figure 19 is a fragmentary view on an enlarged scale of the column and arm assembly, showing details of the swinging follow-up mechanism;

Figure 20 is a fragmentary top plan view of the follow-up mechanism shown in Figure 19;

Figure 21 is a fragmentary vertical sectional view taken on line 21—21 of Figure 20;

Figure 22 is a transverse sectional view taken on line 22—22 of Figure 19;

Figure 23 is a perspective view of the supporting column, as viewed substantially in the direction of the arrow 23 in Figure 1, showing in particular the vertical follow-up mechanism;

Figure 24 is a view in side elevation of the vertical follow-up mechanism;

Figure 25 is a fragmentary view of a portion of the follow-up mechanism shown in Figure 24, with parts broken away;

Figure 26 is a transverse sectional view taken on line 26—26 of Figure 24; and

Figure 27 is a diagrammatic illustration of the hydraulic system for actuating and controlling the various hydraulic devices.

Figure 2:
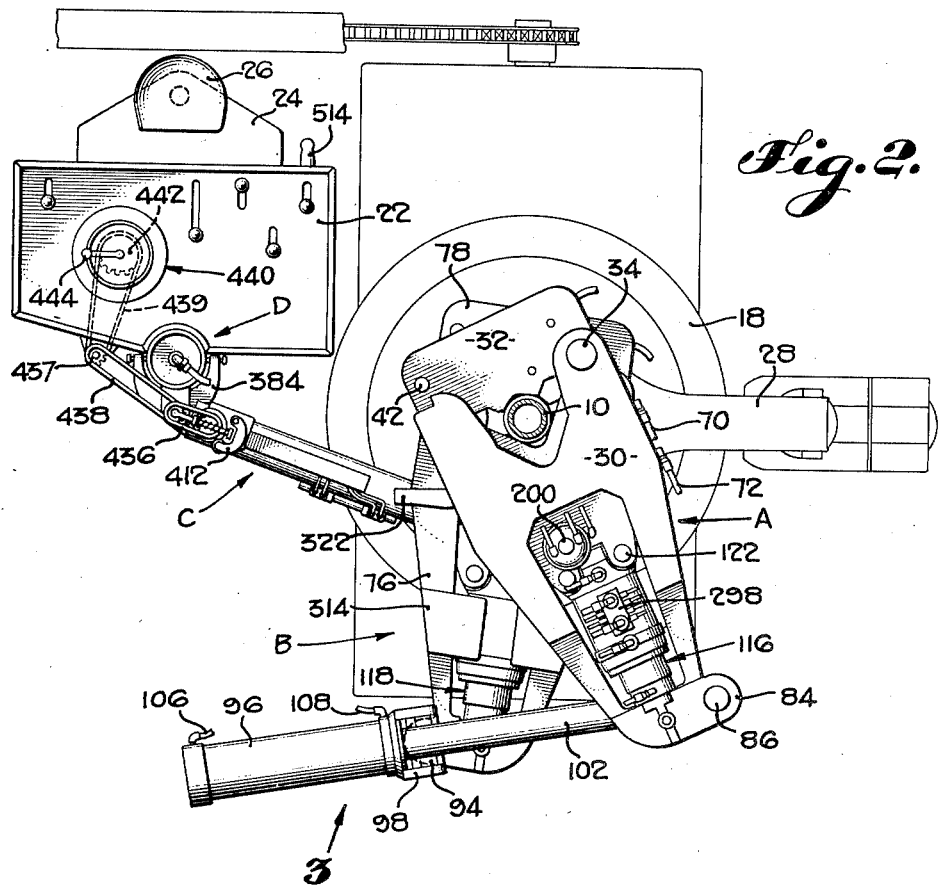
Figure 2 is another top plan view of the tong assembly, but showing the tong structures gripping a drill pipe tool joint either preparatory to making up the joint or after breaking it out.

Referring to the drawings, our improved tong assembly comprises in general a pair of superimposed tong structures generally designated A and B, the lower tong structure B being rigidly supported by the outer extremity of a horizontally extending arm C and the upper tong structure A being supported by the lower tong structure B in a manner to permit oscillation of the upper tong structure relative to the lower tong structure about the axis of the drill pipe 10. The arm C is supported at its inner extremity on a vertically adjustable section 12 of an extensible column D, and is swingable horizontally relative to the column to position the tongs either in pipe engaging position as shown in Figure 2, or in a laterally offset position as shown in Figure 1.

As shown in Figure 3, the lower, stationary section 14 of the column D extends downwardly through an opening in the derrick floor 16 adjacent the rotary table 18 and preferably is supported at its lower end on the derrick cellar foundation and braced by the rotary table support beam 20. The column D carries a control panel 22 and an operator's platform 24 and seat 26, and is mounted in such a position with relation to the well bore that the tongs may be caused to assume either their operative or their inoperative position and also afford the operator an unobstructed view of the operations, and also not obstruct the view of the driller who controls the hoisting equipment and the power-actuated pipe slips 28.

Referring now to Figures 4 to 9 inclusive which illustrate the construction of the tong structures A and B, the upper tong structure A comprises an elongated hollow main frame 30, to one end of which a gate 32 is pivoted at 34 to swing horizontally outwardly and thus permit the tong to be applied laterally to the drill pipe. The inner wall of the gate is provided with a V-shaped jaw portion 36 in which dies 38 are mounted for gripping the tool joint.

A latch 40 is pivotally mounted at 42 on the gate 32 and is provided with a latch surface 44 adapted to cooperate with an opposed latch surface 46 on a lug 48 formed on the frame 30. Operation of the latch 40 and swinging of the gate 32 in opposite directions is effected by a common power-actuated means, herein shown as a cylinder and piston device 50 pivotally mounted at 52 on the side of the frame 30. The piston rod 54 is pivotally connected at 56 to the mid-portion of a lever 58, one end of which is journaled on the gate pivot pin 34 and the other end of which is pivotally connected at 60 to one end of a link 62 which extends transversely through the gate 32 and is pivotally connected at its other end at 64 to the latch 40. The latch is provided with a stop lug 66 which projects through a slot 68 in the adjacent wall of the gate, the engagement of the lug with the ends of the slot serving to limit the pivotal movement of the latch.

Figure 4:
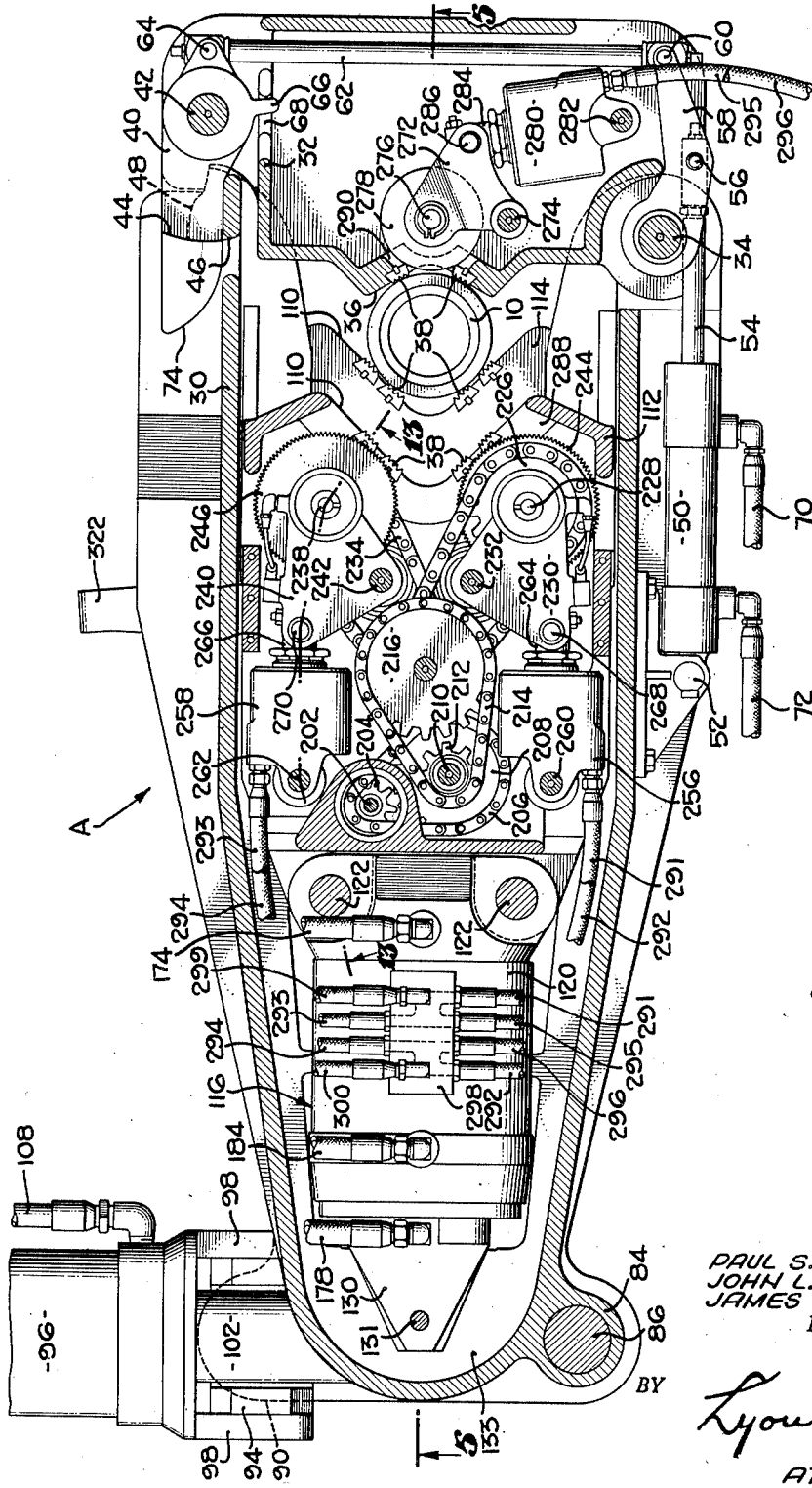
Figure 4 is a horizontal sectional view of the upper tong structure, showing particularly the pipe spinning mechanism therein with the rollers retracted.
Figure 12:
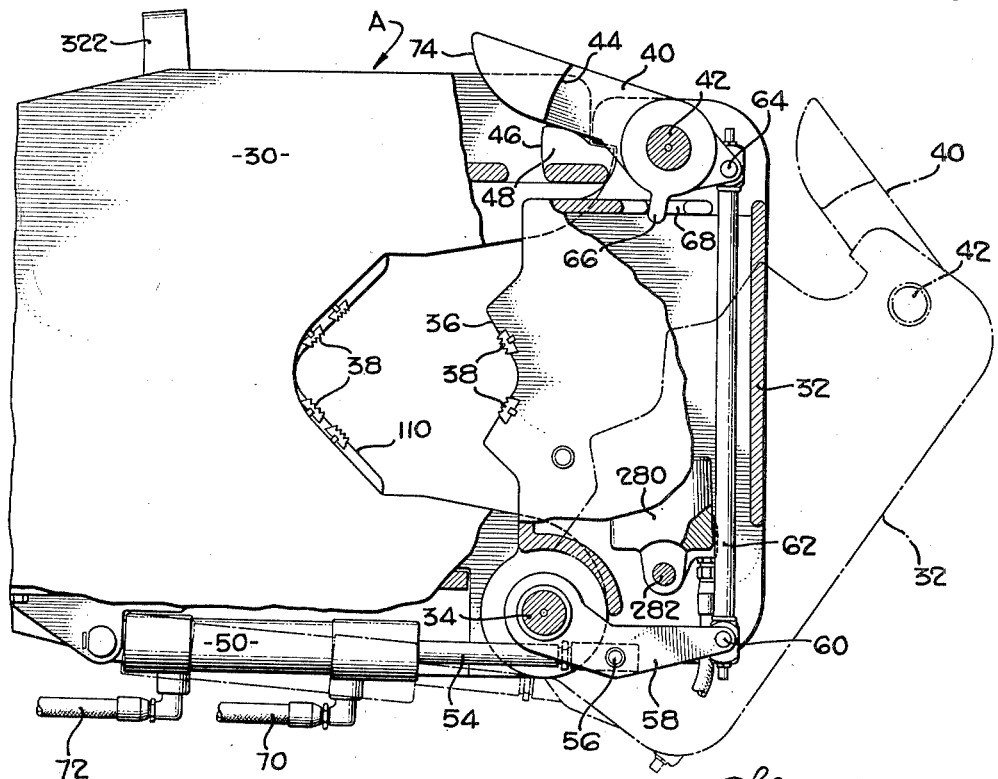
Figure 12 is a fragmentary top plan view of the gripping end portion of the upper tong structure, showing the gate in two positions.

Assuming that the gate 32 is closed as shown in Figure 4, upon admission of pressure fluid to the cylinder 50 through conduit 70 the lever 58 is caused to rotate clockwise about its axis 34, thus shifting the link 62 in a direction to rotate the latch 40 into the released position shown in full lines in Figure 12. Continued movement of the piston rearwardly in the cylinder effects outward swinging of the gate 32 about its pivot 34. To close and latch the gate, pressure fluid is admitted to the cylinder through conduit 72, thus urging the lever 58 counterclockwise. In this case also the force is applied to the gate indirectly through the lever 58, link 62 and latch 40, the latch assuming its closed position until the cam surface 74 thereon engages the outer surface of the lug 48. The inertia of the swinging gate causes it to continue its closing movement, while the latch is cammed open to pass over the lug 48 and interlock therewith.

The frame 76 of the lower tong structure B (Figures 5 and 10) is, except as hereinafter described, substantially identical with the frame 30 of the upper tong structure A, and is provided with a similar gate 78 and latch 80 and a similar gate and latch operating cylinder 82 and associated parts.

At the end of the upper frame 30 opposite that on which the gate 32 is mounted, the frame 30 is provided with a boss 84 which is bored to receive a vertical pivot pin 86 formed integral with a depending trunnion fork 88 (Figure 3). The lower frame 76 is provided with a similar boss 90 (Figure 10) located on the opposite side of the frame from the boss 84 and bored to receive a pivot pin 92 formed integral with a trunnion fork 94 disposed above the boss 90, as shown in Figure 3. A cylinder 96 is provided with ears 98 bored to receive pivot pins 100 which also extend through aligned bores in the trunnion fork 94 to support the cylinder 96 on the lower frame 76. A piston is mounted in the cylinder 96 and is connected to a piston rod 102, the outer end of which is connected to the upper frame 30 by a pivotal connection at 104 with the fork 88.

Upon admission of pressure fluid to one end of the cylinder 96 and discharge of fluid from the other end through the conduits 106 and 108, the upper tong structure A is caused to oscillate relative to the lower tong structure B in either selected direction and thus, when the respective sections of a tool joint are gripped by the jaws of the respective tong structures, the joint is made up or broken out as desired.

As has been previously described, the gates 32 and 78 are provided with V-shaped jaw faces 36. Complementary, opposed jaw faces 110 are provided on jaw frames 112 and 114 which are mounted within the main frames 30 and 76, respectively, for longitudinal movement toward and away from the stationary jaw faces 36. The slidable jaw frames 112 and 114 are substantially identical with each other, except that the upper jaw frame 112 has mounted therein pipe spinning mechanism to be described hereinafter. The jaw frames are advanced and retracted within their respective main frames by differential piston and cylinder constructions, generally designated 116 and 118, and inasmuch as these are of identical construction, only that associated with the upper frame will be described.

Figure 8:
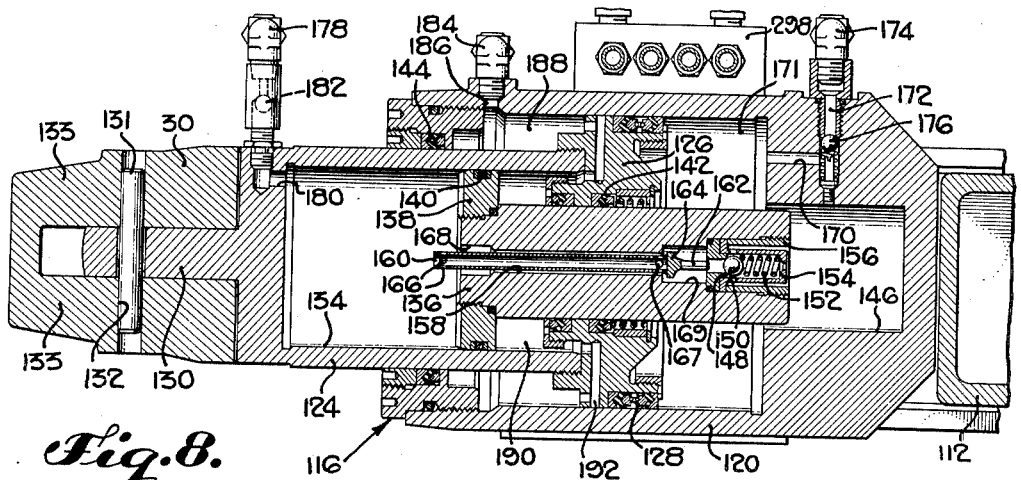
Figure 8 is an axial section on an enlarged scale of one of the differential cylinder and piston structures shown in Figure 5, with the parts shown in a different position.

Referring to Figures 4, 5 and 8, the rearward end of the jaw frame 112 is rigidly secured to the head of a cylinder 120 by a pair of transversely spaced vertical bolts 122. Mounted within the cylinder 120 is a hollow main piston 124 having a piston head 126 sealed to the wall of the cylinder by packing 128. The outer end of the piston 124 is provided with a boss 130 bored to receive a pin 131 which extends into aligned bores 132 in web portions 133 formed on the rearward portion of the main frame 30, whereby to secure the piston 124 stationary relative to the main frame. Thus upon relative axial movement between the cyinder 120 and the piston 124 the jaw frame 112 is advanced or retracted.

The interior of the hollow piston 124 constitutes a cylinder 134 in which is mounted a booster piston 136 having a piston head 138 sealed to the cylinder wall by packing 140. The booster piston 136 is sealed to the main piston head 126 by packing 142, and the main piston 124 is similarly sealed to the head of the main cylinder 120 by packing 144. The closed end of the main cylinder 120 is bored at 146 to loosely receive the adjacent end of the booster piston 136, which is recessed to receive a check valve assembly comprising a valve seat 148, a ball valve 150 urged against its seat by a spring 152 confined within a cage 154, and a retaining sleeve 156 threadedly connected to the piston. A central bore 158 extends through the piston 136 from the check valve recess to the opposite end of the piston, and loosely mounted therein is a hollow stem 160. The inner end of the stem is of reduced diameter at 162 to enable it to freely enter the central passage in the valve seat 148 and move the valve 150 away from the seat. A flange 164 is formed on the stem adjacent its reduced end portion to limit movement thereof in the opposite direction. Lateral ports 166 and 167 are formed in the opposite ends of the stem, and the ends of the bore 158 are enlarged at 168 and 169 to permit free flow of fluid through the ports 166 and 167 when the stem is entirely disposed within the piston.

An inlet port 170 is formed in the head of the cylinder 120 communicating with the cylinder space 171 to the right of the piston head 126 and with an inlet port 172 to which is connected what is termed a low pressure conduit 174. An inwardly opening check valve 176 is mounted in the port 172, permitting fluid flow into the cylinder but preventing outward flow. What is termed a high pressure conduit 178 is connected to the closed end of the main piston 124 and communicated through a port 180 with the booster cylinder 134. An inwardly opening check valve 182 is mounted in this conduit. A third conduit 184 is connected to the cylinder 120 and communicates through a port 186 with the annular main cylinder space 188. The cylinder space 188 communicates with the annular booster cylinder space 190 through a port 192 in the cylinder head 126. The check valve 182 is of the pilot-operated type and is adapted to be opened by pressure in conduit 184, as indicated in Figure 27, to permit return flow of fluid from the cylinder spaces 134 and 171 to the reservoir through the conduit 178 during the retracting stroke.

The operation of the differential cylinder-piston device is as follows: Assume that the jaw frame 112 is fully retracted, providing the maximum spacing between the jaw faces 36 and 110, and that it is desired to advance the frame 112 to grip a tool joint. Under these circumstances both the main piston 124 and the booster piston 136 are fully telescoped within their respective cylinders and the stem 160 is disposed wholly within the bore 158, in which position it holds the check valve 150 off its seat 148. Fluid under pressure is admitted to the cylinder space 171 through conduit 174 and ports 170 and 172, and cylinder space 188 is connected through port 186 and conduit 184 with a return line. Inasmuch as the check valve 150 is held off its seat, the pressure of the fluid in cylinder space 171 is transmitted through the interior of the hollow stem 160 to the interior of the booster cylinder 134, but is prevented by the check valve 182 from discharging therefrom through the conduit 178. Thus the cylinder 120, to which the jaw frame 112 is attached, and the booster piston 136 are moved to the right. As the booster piston moves away from the end wall of the cylinder 134, the check valve spring 152 is effective to move the ball valve 150 and the stem 160 to the left, thus seating the valve on its seat 148 and cutting off further flow or transmission of pressure through the booster piston from the cylinder space 171 to the cylinder space 134. The booster piston 136 then remains stationary while the cylinder 120 and the jaw frame 112 continue to move to the right until the jaw face 110 contacts the tool joint. Up to this point the fluid pressure required is only that necessary to overcome friction and the inertia of the moving parts, but upon engagement of the jaw face 110 with the tool joint, the pressure in cylinder space 171 increases abruptly.

As shown in Figure 27, the high pressure conduit 178 leading to the cylinder 134 is connected to the low pressure conduit 174 by a sequence valve 194 which functions automatically, when the pressure in conduit 174 reaches a predetermined magnitude, to admit fluid at system pressure to the cylinder 134. By reason of the difference in areas of the piston head 138 and the piston 136, the system pressure acting on the piston head 138 subjects the fluid entrapped in the cylinder space 171 and in the bore 146 to a proportionately higher pressure. This fluid is prevented by the check valve 176 from discharging through the low pressure conduit 174. In this manner the intensified system pressure is exerted against the entire internal end surface area of the cylinder 120, and the force thereof is transmitted to the jaw face 110 to effect a powerful gripping of the tool joint.

To effect the return stroke of the pistons to cause retraction of the jaw frame 112, pressure fluid is admitted through the conduit 184 to the cylinder space 188 to the left of the piston head 126. The pressure in conduit 184 opens the pilot-operated check valve 182 (Figure 27) to permit discharge of fluid from the cylinder 134. The check valve 176 prevents discharge of fluid from the cylinder space 171 through conduit 174, and the check valve 150 prevents flow through the passage 158 from the cylinder space 171 to the cylinder 134 until such time as the booster piston 136 is forced to the left a distance sufficient to cause the stem 160 to engage the head of the cylinder 134. At this point the movement of the stem is arrested and continued movement of the piston 136 causes the stem 160 to move the valve 150 away from its seat, thus permitting the fluid in cylinder space 171 to discharge through the passage 158 and into the cylinder 134 and thence outwardly through the conduit 178. In this manner the full retraction of the booster piston during the return stroke of the main piston is assured.

Figure 13:
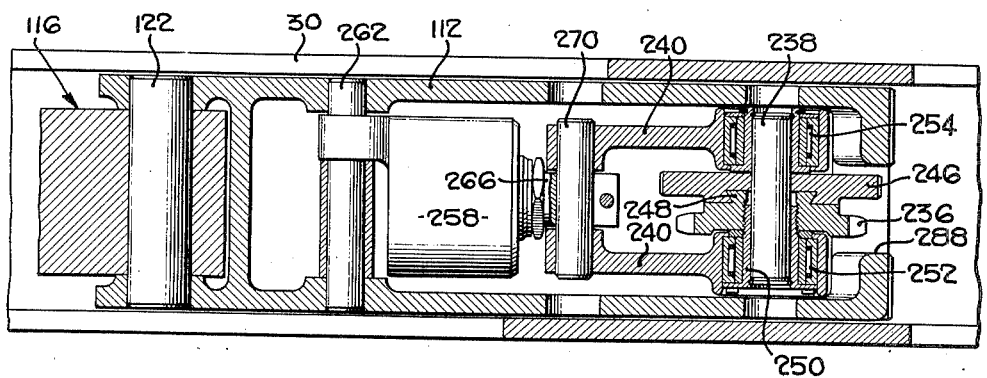
Figure 13 is a fragmentary longitudinal sectional view taken on broken section line 13—13 of Figure 4.

Referring now to the pipe spinning mechanism incorporated in the upper tong structure A and illustrated in Figures 4, 5, 9 and 13, it will be observed that a rotary fluid motor 200 is mounted on the upper surface of the jaw frame 112, the motor shaft 202 being upright and projecting downwardly into the frame 112. A small sprocket 204 on the lower end of the shaft 202 is connected by a drive chain 206 with a large sprocket 208 fixed to the lower end of a sleeve 210 (Figure 5), to the upper end of which is secured a small sprocket 212. The sprocket 212 is connected by a drive chain 214 with a large sprocket 216 secured to the upper end of a hub 218 suitably journaled in the frame 112 and disposed in the central longitudinal plane of the frame. A pair of sprockets 220 and 222 are also secured to the hub 218, the upper sprocket 220 being connected by a chain 224 with a sprocket 226 mounted on a shaft 228 journaled in a roller frame 230 pivotally mounted on a vertical pivot pin 232 for limited swinging movement within the frame 112. The lower sprocket 222 is similarly connected by a chain 234 with a sprocket 236 mounted on a shaft 238 carried by a roller frame 240 mounted on a pivot pin 242 for swinging movement with the frame 112. The sprockets 226 and 236 are each secured to respective drive rollers 244 and 246 adapted to be selectively advanced into frictional driving contact with a tool joint or retracted into the frame 112 into inactive positions. As shown in Figure 13, the drive roller 246 is keyed to the sprocket 236 by a transverse dovetail connection 248, the sprocket being threadedly connected to a sleeve 250 secured to the shaft 238 and journaled in a lower bearing 252, the upper end of the shaft 238 being journaled in a similar bearing 254 mounted in the roller frame 240. The other drive roller 244, sprocket 226 and shaft 228 are similarly mounted in the roller frame 230.

Each of the roller frames 230 and 240 is adapted to be oscillated about its pivotal axis 232 or 242 by remotely controlled hydraulic actuators, to move the drive rollers 244 and 246 between their operative and inactive positions. Thus, cylinders 256 and 258 are pivotally mounted in the frame 112 on pivot pins 260 and 262, respectively. Pistons in the cylinders are connected respectively to piston rods 264 and 266, the outer ends of which are pivotally attached, by pivot pins 268 and 270, to the respective roller frames 230 and 240.

A roller frame 272 is mounted in the gate 32 for oscillation about a pivot pin 274, and carries a shaft 276 on which an idler roller 278 is journaled. The roller frame 272 is adapted to be oscillated about its pivot 274 to move the roller into or out of engagement with a tool joint, by a cylinder and piston assembly 280 pivotally mounted at 282 in the gate, the piston rod 284 of which is pivotally connected at 286 to the roller frame 272.

Figure 7:
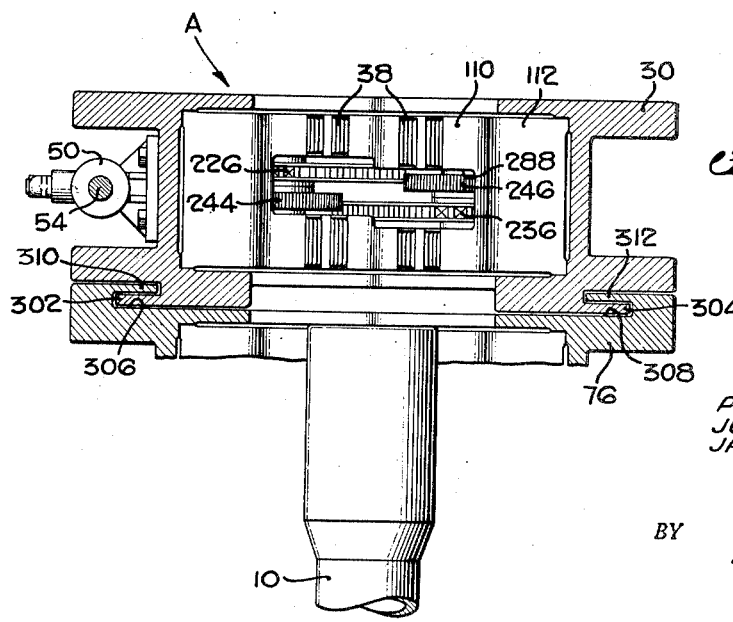
Figure 7 is a transverse sectional view taken on line 7—7 of Figure 5.
Figure 9:
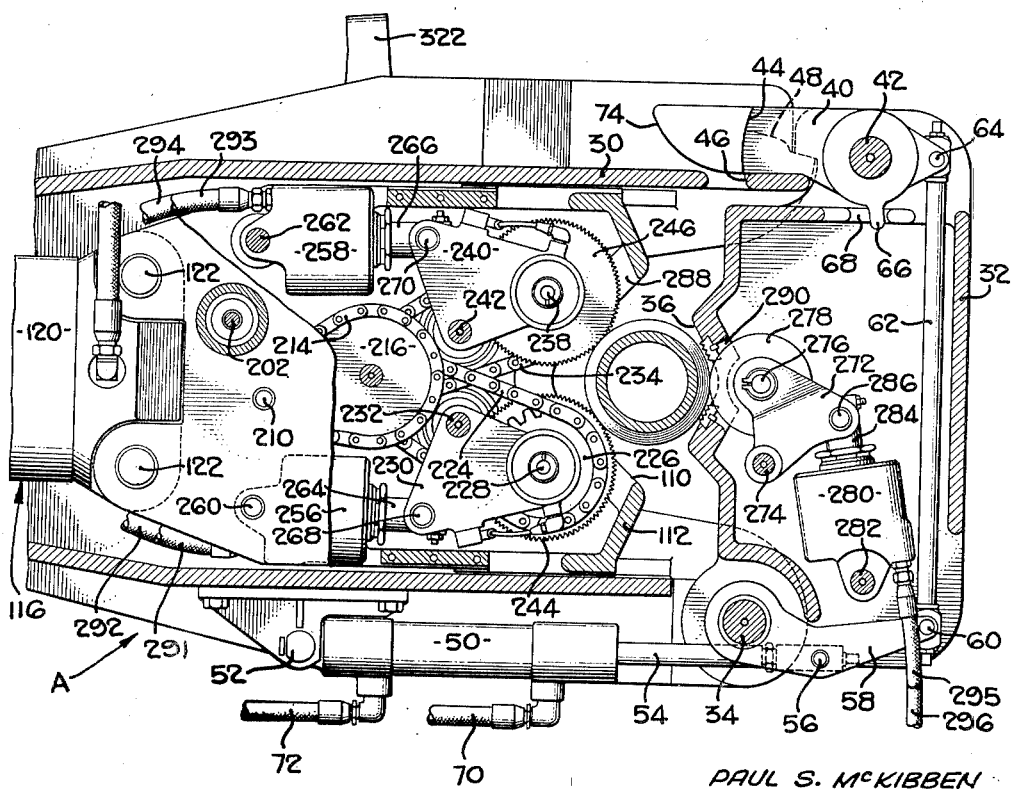
Figure 9 is a fragmentary view corresponding to the right-hand portion of Figure 4, but showing the spinning rollers in operative position.

As shown in Figures 4, 5 and 7, the jaw face 110 in the upper jaw frame 112 is provided with an opening 288, and the jaw face 36 in the upper gate 32 is similarly provided with an opening 290, to permit the rollers 244, 246 and 278 to be projected through the jaw faces beyond the dies 38 and into frictional contact with the tool joint, as shown in Figure 9. The dies 38 in this instance are arranged in separate upper and lower groups above and below the openings 288 and 290. The driving rollers 244 and 246 are shown herein as being toothed or knurled to prevent slippage on the tool joint, but if desired they may be smooth or may be faced with suitable friction material.

The roller actuating cylinders 256, 258 and 280 are each double-acting and are fitted with conduits 291 and 292, 293 and 294, 295 and 296, respectively. A manifold 298 may be conveniently mounted on the cylinder 116 for interconnecting the corresponding supply conduits 291, 293 and 295 and the return conduits 292, 294, 296 and thus effect actuation of the three rollers in unison. Main supply and return conduits 299 and 300 lead from the manifold 298 to a control valve, as hereinafter described.

Referring now to the manner in which the upper tong structure A is mounted on the lower tong structure B, it will be observed by reference to Figures 4, 6, 7 and 10 that a pair of depending L-shaped arcuate tongues 302 and 304 are formed on the lower surface of the upper main frame 30, and are loosely received in grooves 306 and 308 formed between the upper surface of the lower main frame 76 and a pair of inwardly extending flanges 310 and 312 formed integral with the frame 76. These interlocking connections are disposed at opposite sides of the frames in the transverse region of the pipe recess between the jaw faces 110 and 36 and serve to loosely restrain the forward ends of the tong frames against relative lateral displacement while permitting relative oscillation thereof about the axis of the drill pipe. The lower surfaces of the tongues 302, 304 may constitute bearing pads slidably engaging the upper surface of the lower frame. Suitable bearing pads are formed on the confronting surfaces of the frames 30 and 76 adjacent the opposite end thereof, as indicated at 314 in Figures 5 and 10.

An important feature of this invention is the adaptability of the tong structures to accommodate a wide range of drill pipe, tool joint and casing sizes, this being rendered possible by the substantial range of retraction and advancement of the jaw frames 112 and 114. However, inasmuch as the jaw faces 36 on the gates 32 and 78 are in fixed relation to the respective main frames when the gates are closed, the location of the axis of the pipe or joint being gripped varies with different pipe or tool joint sizes, being progressively farther from the gates as the pipe size increases. Inasmuch as the axis of the pipe or tool joint constitutes the axis of oscillation of the upper tong structure during the tonging operation, and inasmuch as the location of this axis varies with different pipe or tool joint sizes as pointed out above, it is impossible to provide closely interfitting arcuate guide means between the main frames to restrain the frames against relative longitudinal displacement, such as would be possible with a fixed axis of oscillation. Furthermore, it frequently occurs that one section of a tool joint may be smaller or larger than the mating section, due to abrasive wear during the drilling operation or because of its having been built up with hard-facing material. In such instances relative longitudinal shifting of one tong structure relative to the other must occur in order to bring the jaw faces on the gates into contact with the vertically misaligned peripheries of the two joint sections. This shifting of the frames can be effected by the action of the grip cylinder 120 and jaw frame 112 provided the relation of the two frames is such as to permit the gates to be closed and latched, but it is not feasible to provide sufficient power in the gate operating mechanism to enable it to shift the frame by premature contact with the pipe joint before the gate is fully closed and latched.

In order to provide a floating mounting of the upper frame 30 on the lower frame 76 to permit oscillation about different relatively offset axes, and in order to insure that at the time the tongs are applied to the pipe the two main frames are so relatively disposed that both gates may be closed without interference by the pipe, there has been provided a longitudinally floating and yieldable centering guide between the main frames. Referring to Figures 10 and 11, a pair of concentric segmental arcuate guide strips 320 are secured to the lower wall of the upper frame 30 and define an arcuate trackway 321.

The common center of curvature of these guide strips is arbitrarily selected as that coinciding with the axis of the most commonly used size of tool joint, that is, approximately 6 inches in diameter. A lever 322 is pivotally mounted intermediate its ends on a pivot stud 324 secured to the upper wall of the lower frame 76. The inner extremity of the lever 322 carries a roller 326 which is disposed in the arcuate trackway 321. As shown most clearly in Figure 11, the lever 322 projects laterally beyond the frame 76 and is curved downwardly and inwardly beneath the upper flange 77 of the frame, the inwardly extending portion thereof having a web 328 formed thereon. Secured to the lower surface of the flange 77 at opposite sides of the lever 322 are cylinders 330 and 332 in which are mounted pistons and plungers 334, 336. The plungers abut against opposite sides of the web 328, the arrangement being such that when the two main frames 30 and 60 are longitudinally aligned so that the jaw faces 36 on their gates are in vertical alignment, the pistons in both cylinders 330, 332 are at the extreme inner ends of the cylinders. The cylinders are connected by conduits 338, 340 to the main pressure line of the hydraulic system, whereby the lever is yieldingly urged toward its neutral position but is permitted to swing in either direction in response to a biasing force exerted thereon by the guide strips 320 through the roller 326, should the upper tong be required to shift longitudinally.

It has been previously stated that the upper grip cylinder 120 is secured to the jaw frame 112 by a pair of transversely spaced pins 122 which, as shown in Figure 13, terminate within the main frame 30. Referring to Figure 10, it will be observed that the lower grip cylinder 118 is secured to the lower jaw frame 114 in a similar manner by a pair of pins 123 which, however, project downwardly below the lower main frame 76, as shown in Figure 14. The projecting portions of the pins 123 are received in sockets 342 formed in upstanding bosses 344 integral with a saddle member 346 rigidly clamped to the outer end of the arm C by U-bolts 348 (Figures 14 and 16). In this manner the tong structures may be detached from the arm C simply by raising them sufficiently to withdraw the pins 123 from the sockets 342. Hence in case the drill pipe should be inadvertently raised while either tong grips the tool joint, the tong assembly would become detached from the arm C and damage to the arm and associated parts would be avoided.

The manner in which the arm C is mounted for horizontal swinging movement relative to the column D, and the mechanism for swinging the arm and controlling its movements will now be described. Referring to Figures 14 to 22, the vertically adjustable section 12 of the column D is provided with upper and lower pairs of brackets 350 and 352 and between the brackets of the respective pairs are mounted pivot bosses 354 and 356 secured to an upright T-beam 358 rigidly secured, as by welding, to the radially inner end of the arm C. As shown most clearly in Figure 19, a stationary pivot pin 360 extends through aligned bores in the upper brackets 350 and in a spacer sleeve 362 secured in the boss 354. Relatively rotatable bearing plates 364, 365 are interposed between the boss 354 and the lower bracket 350, the radial and thrust bearing surfaces being lubricated from a fitting 366 through a lubricant passage 368 in the pin 360.

The lower pair of brackets 352 and the lower pivot boss 356 are similarly pivotally interconnected by a stationary pivot pin 370, which projects downwardly below the lowermost bracket 352 and constitutes a shaft on which a sprocket 372 is journaled. An additional bracket 353 below the sprocket supports the lower extremity of the shaft. A sprocket 374 is journaled on a stud 376 depending from the outer end of the arm C, and a chain 378 is trained around the two sprockets 372 and 374 and has its ends secured at 377 and 379 to opposite ends of a piston rod 380 which projects from opposite ends of a cylinder 382 and carries a piston (not shown) reciprocable in the cylinder. The cylinder 382 is suitably secured to the arm C.

The sprocket 372 is normally fixed against rotation on its shaft 370 by being rigidly attached to a U-shaped yoke 384 (Figure 15) which is oscillatable on the shaft and has clamping studs 386 threaded through its extremities. The studs 386 are adapted to be tightened into clamping engagement with the column section 12 to secure the yoke in adjusted position. By loosening either stud and tightening the other, the yoke and the sprocket 372 may be rotated through a small arc about the shaft 370 into different adjusted positions, for a reason to be hereinafter described. By reason of the normally stationary mounting of the sprocket 372, it will be evident that upon movement of the piston in the cylinder 382 in a left hand direction, as viewed in Figure 14, the arm C is caused to swing in a counterclockwise direction as viewed from above, to thereby move the tong assembly from its laterally offset position shown in Figure 1 to its pipe-engaging position shown in Figure 2. Similarly, movement of the piston to the right in cylinder 382 causes the arm C to swing in the reverse direction.

The admission and discharge of fluid to and from the cylinder 382 on opposite sides of the piston therein is controlled by a four-way valve 388 carried by a bracket 390 pivotally attached by a bolt 392 to the web portion 359 of the T-beam 358. The valve 388 is connected to the opposite ends of the cylinder 382 by supply and return conduits 394 and 396. In order to avoid fluid hammer which would otherwise result from the momentum of the moving parts upon abrupt closing of the valve, relief valves 398 and 400 are provided in the conduits 394 and 396.

In order to relieve the operator of the necessity of manually returning the valve to its neutral position at the end of the swinging stroke of the arm C, an automatic follow-up mechanism is provided which automatically returns the valve to neutral position and thereby stops the swinging movement of the arm at any preselected position. This follow-up mechanism is as follows:

The valve stem 402 of the valve 388 is biased to the left, as viewed in Figures 14, 19 and 22, and is engaged by a stud 404 adjustably mounted in the free end of a rocker arm 406 which is secured to the lower end of an upright rocker shaft 408 journaled in a stationary sleeve 410 secured to the bracket 390. Secured to the upper extremity of the rocker shaft 408 is a cam follower 412, on the free end of which is mounted a shaft 413 on which is journaled a cam roller 414. A plate 416 is secured to the upper end of the sleeve 410, and carries an upright stud 417 on which is journaled a hub 418. A sprocket 420 and a cam disc 422 are fixed to the hub 418 to rotate therewith, the periphery of the cam disc being divided, as shown in Figure 20, into two approximately semi-circular portions 423 and 424 which are joined by the shoulder 425 and the inclined cam surface 426.

The upper pivot pin 360 is provided with an integral upward extension 428 on which is journaled a hub 430 to which is secured a pair of sprockets 432 and 434. The upper sprocket 432 is connected by a chain 436 with the sprocket 420, and the lower sprocket 434 is connected by a chain 438, an idler sprocket 437 and a chain 439, with a controller 440 mounted in the control panel 22 (Figures 1 and 2). The controller comprises a sprocket 442 within the panel and a rotatable control lever 444 mounted above the panel and operatively connected to the sprocket 442. By rotating the lever 444 in either direction to a desired position, the cam disc 422 is rotated in the same direction to a corresponding position which, as will be pointed out below, predetermines the position of the arm C at which its swinging movement will be automatically stopped.

A rod 446 is secured at one end to the upper extremity of the pivot pin extension 428, the free end of the rod passing loosely through an opening 448 in an upright plate 450 mounted on the plate 416. A compression spring 452 is interposed between the plate 450 and a flange 454 on the rod 446 and thus yieldingly urges the rigid structure comprising the plates 450 and 416 and the sleeve 410 to swing outwardly about the pivot bolt 392 which constitutes the sole means of support for the aforesaid structure on the T-beam 358. The purpose of this construction is to maintain a predetermined tension on the chain 436 and thus prevent backlash which, if it occurred, might interfere with the proper control of the valve 388. The plate 416 and the parts mounted thereon are restrained against movement transverse to the plane of pivotal movement thereof about the bolt 392 by a stud 456 threaded into a web 458 secured to the T-beam 358, and slidably received in an elongated slot 460 in the plate 416.

In the position of the cam disc 422 shown in Figure 20, the cam roller 414 engages the inclined cam surface 426 intermediate its ends, and in this position the stem 402 of the valve 388 is held in its neutral position wherein both conduits 394 and 396 connecting the valve with the cylinder 382 are out of communication with the main fluid supply and return lines and hence the arm C is held stationary by the fluid lock in the cylinder. Let it be assumed that the tongs are positioned as shown in Figure 1. Upon rotation of the control lever 444 counterclockwise from the position shown in Figure 1 to that shown in Figure 2, the cam disc 422 is rotated in a counterclockwise direction. The roller 414 moves inwardly along the cam surface 426 and onto the surface 423 thus causing the cam follower 412, the rocker shaft 408 and the rocker arm 406 to rock slightly in a clockwise direction about the axis of the shaft 408. This movement of the rocker arm 406 permits the valve stem 402 to be shifted to the left, under the influence of its biasing spring, to establish communication through the valve 388 between the source of fluid supply and the conduit 394 and connecting the conduit 396 with the return line. Pressure fluid is thus admitted to the right-hand end of the cylinder 382 and exhausted from the other end, moving the piston and the piston rod to the left and causing the arm C to swing in a counterclockwise direction.

Inasmuch as the sprocket 432 remains stationary during swinging of the arm C and all parts mounted thereon, including the sprocket 420 and the cam disc 422, it will be evident that during such movement of the arm C the sprocket 420 and the cam disc 422 are caused to rotate in a clockwise direction about their own axes. The arrangement is such that as the arm C and the tongs approach the position shown in Figure 2, the inclined cam surface 426 on the cam disc 422 likewise approaches its original position shown in Figure 20. When the cam surface 426 contacts the roller, continued rotation of the cam disc rocks the cam follower 412, the rocker shaft 408 and the rocker arm 406 in a counterclockwise direction, causing the valve stem 402 to be shifted to the right. As stated previously, when the roller 414 reaches a point approximately midway of the length of the cam surface 426, the valve stem 402 is in its neutral position and the arm C comes to rest.

The manner in which the reverse operation of swinging the arm in a clockwise direction, as from the position shown in Figure 2 to that shown in Figure 1, will be apparent from the foregoing explanation. In this case, however, the cam disc 422 is rotated clockwise by similar manipulation of the control lever 444, causing the roller 414 to move outwardly along the cam surface 426 and thence along the constant-radius surface 424 for an arcuate distance depending on the extent of arcuate movement of the control lever 444. It will thus be apparent that the operator may preselect the position in which the arm will come to rest, simply by the setting given the control lever, and that he may then direct his attention to other controls with the assurance that the swinging movement will be automatically discontinued when the arm reaches the preselected position.

Occasionally the rotary table 18 shifts its position on the support beams 20, in which event the upper end of the string of drill pipe, which is supported in the rotary table during tonging operations, changes its position. It then becomes necessary to adjust the operative position in which the tongs are automatically stopped by the follow-up mechanism. The provision of the yoke 384, adjustable with the normally stationary sprocket 372, affords a convenient means for effecting small range angular adjustment of the arm C independently of the follow-up mechanism.

It has been previously stated that the vertical column D comprises a stationary section 14 rigidly supported in the derrick, and a vertically movable section 12 on which the arm C is mounted. The section 12 is adapted to be raised hydraulically and permitted to descend by gravity, to dispose the tong structures A and B in different vertically spaced positions in accordance with the varying height of successive drill pipe tool joints above the derrick floor.

Referring to Figure 19, wherein the column section 12 is shown in its lowermost position, it will be seen that the section 12 includes an end plate 462 in which is mounted a centrally disposed cylinder head 464 having a central fluid passage 466 communicating with a combined inlet and exhaust conduit 468. Secured to the cylinder head 464 is a depending cylinder 470, at the lower extremity of which is an internal stuffing box assembly 472 slidably sealing the cylinder to a stationary plunger 474. The plunger 474 has an imperforate upper end wall 476 and is mounted concentrically with the stationary column section 14, being supported therein by a partition 478. The section 14 extends upwardly in telescopic relation to the plunger 474 and the cylinder 470 and serves as a guide for the movable section 12, there being one or more guide bushings 480 on the inner wall of the section 12 having a sliding fit on the section 14. In like manner, the cylinder 470 is guided on the plunger 474 by a guide bushing 482 mounted on the outer wall of the plunger. The bushing 482 serves to limit the upward movement of the cylinder, while downward movement thereof is limited by engagement of the end plate 462 with the upper end of the section 14. It will be evident that upon admission of pressure fluid to the cylinder space between the cylinder head 464 and the upper end wall 476 of the plunger 474, the cylinder 470 and the section 12 will be raised, and that upon exhausting the fluid from the cylinder space the weight of the tong assembly, the arm structure and the movable column parts will cause their descent as rapidly as desired.

In view of the pivotal mounting of the arm C on the column section 12, it is essential that this section be restrained against rotation relative to the stationary column section 14. To this end, torque links generally designated 484 are provided, comprising a pair of parallel links 486 journaled at one end on a trunnion pin 488 extending through the column section 14 and journaled at their opposite ends on a rod 490, and a second pair of parallel links 492 also journaled at one end of the rod 490 and journaled at their opposite ends on aligned trunnion pins 494 secured to the lower end of the column section 12. Any tendency of the column section 12 to rotate relative to the section 14 is obviously restrained by the interconnection of the pairs of links 486 and 492 by the rod 490.

It is also desirable that the vertical movement of the tongs, as well as their horizontal swinging movement, be automatically discontinued at a preselected position. To this end a vertical follow-up mechanism is provided for controlling the admission and exhaust of fluid from the cylinder 470. Referring to Figures 23 to 26 inclusive, a three-way valve 500 is mounted within the control panel 22 with its stem 502 disposed vertically. A connecting link 504 is pivotally connected at its upper end to the valve stem 502 and at its lower end by a pivot pin 505 to one end of a lever 506, the other end of which is pivotally connected at 507 to a carriage 508 mounted between a pair of bars 510 mounted in vertical position in the control panel 22 and constituting a trackway engaged by rollers 512 journaled on the carriage 508. The carriage is adapted to be manually raised or lowered by manipulation of a control lever 514 rigidly secured thereto by a pin 516, the lever projecting from the panel through a slot 518 formed in the side wall thereof. A brake block 520 mounted in the carriage 508 bears against one of the bars 510 to frictionally retain the carriage in any position to which it may be adjusted, and in addition, means are provided for releasably securing the carriage in certain preselected positions. This means comprises a threaded rod 522 mounted adjacent one of the bars 510 and parallel thereto, and a pair of collars 524, 526 threaded on the rod 522 and having circumferential grooves 525, 527 formed thereon. A latch member 528 is pivotally mounted at 530 on the carriage 508 and is connected at 532 to one end of a detent 534 slidable in a socket 536 in the carriage, the other end of the detent carrying a roller 537 adapted to selectively engage the groove 525 or 527. The detent is urged toward the rod 522 by a spring 538 and may be retracted from engagement with the grooves 525, 527 by raising the handle of the latch 528. It will be evident that the collars 524 and 526 may be adjusted along the rod 522 into any desired positions which, as will be explained hereinafter, represent two specific preselected positions in which it is desired to automatically stop the raising or lowering movement of the tongs.

The lever 506 is pivotally connected intermediate its ends to the upper extremity of a resiliently extensible and contractible link generally designated 540. The link comprises a rod 542 connected at its upper end to the lever 506 by a pin 544, the lower end of the rod having a head 546 on which normally rests a sleeve 548 having an end flange 550 forming a lower abutment for a spring 552. A sleeve 554 is telescoped over the rod 542 and has a bushing 556 secured in its upper portion which forms a stop for an upper spring abutment sleeve 558 within which the rod 542 is slidable. The upper end of the spring abutment sleeve 558 is also adapted to be engaged by the lower end of a sleeve 560 threadedly secured to the rod 542, and in a similar manner the flange 550 on the lower spring abutment sleeve 548 also normally engages an internal shoulder 561 in the sleeve 554. Lubrication of the relatively slidable surfaces is effected through a lubricant fitting 562.

The lower extremity of the sleeve 554 is pivotally connected, by an eye bolt 564 and a pivot pin 566, to a rocker arm 568 secured to one end of a rock shaft 570 which, as shown in Figure 23, is journaled in bearings 572 secured to the bottom wall of the control panel 22. A second rocker arm 574 is secured to the opposite end of the rock shaft 570, the end of the rocker arm 574 being connected to the upper end of a link 576 extending downwardly below the panel and having its lower extremity connected to a lever 578 formed integral with one of the upper pair of torque links 492.

The operation of the vertical follow-up mechanism is as follows:

Assume that the tong assembly is in a lowered position which is predetermined by setting the control lever 514 in the position shown in Figure 24, with the detent roller 537 engaging the groove 527 in the lower collar 526, and assume also that it is desired to raise the tong assembly to a higher preselected position corresponding to the setting of the upper collar 524. The operator grasps the control lever 514 and the latch 528, first raising the latch handle to retract the detent 534 and then raising the control lever to move the carriage 508 upwardly. The detent roller 537 is forced inwardly against the action of the spring 538 upon engagement with the lower conical surface of the collar 524, and then snaps into the groove 525, arresting the upward movement of the carriage.

Initial upward movement of the carriage 508 causes the lever 506 to rock counterclockwise about the pivot pin 544 as a fulcrum, thus moving the valve stem 502 downwardly, it being understood that the lower end of the link 540 is held stationary by its connection to the rocker arm 568, and that the resistance of the spring 552 to compression is greater than the force required to move the valve stem 502. The extent of movement of the valve stem in either direction from its neutral position to its open position is, however, very slight and if it should reach its limit of travel before the carriage 508 has reached its upper position, any subsequent rocking of the lever 506 will take place about the pivot pin 505 as a fulcrum. In this event the link 540 is extended in length, the spring 552 compressing and permitting upward movement of the rod 542 relative to the sleeve 554.

Downward movement of the valve stem 502 establishes communication between the pressure fluid supply line 501 and the conduit 468 connecting the valve to the lifting cylinder 470, thus raising the column section 12 and the tong assembly carried thereby. During upward movement of the column section 12, the upper torque links 492 are caused to pivot slightly in a counterclockwise direction, as viewed in Figure 23, about the trunnion pins 494. The upward movement of the free end of the lever 578 moves the link 576 upwardly, rocking the rocker arms 574 and 568 and connecting rock shaft 570 in a counterclockwise direction and thus moving the sleeve 554 of the link 540 upwardly. If the link has initially been extended in length, no upward movement of the rod 542 will occur until the link assembly has re-assumed its normal condition as shown in Figure 24. Thereafter any further upward movement of the sleeve 554 is transmitted to the rod 542 by the shoulder 561 through the lower spring abutment sleeve 548, the spring 552, the upper spring abutment sleeve 558 and the sleeve 560. Upward movement of the rod 542 causes the lever 506 to rock clockwise about the pivot 507, thus raising the opposite end of the lever and moving the valve stem 502 upwardly into its neutral position, whereupon the upward movement of the tongs is automatically arrested at a position which has been preselected by the setting of the collar 524 on the threaded rod 522.

From the foregoing description, the operation of the vertical follow-up mechanism during lowering of the tong assembly will be readily understood. In this case the control lever 514 is lowered, thereby rocking the lever 506 clockwise about the pivot pin 544 initially, and about the pivot pin 505 after the valve stem has reached its limit of upward travel. The fluid return line 503 is in this case placed in communication with the conduit 468 to permit discharge of fluid from the cylinder 470 and consequent lowering of the tong assembly, the valve stem being automatically returned to its neutral position when the tong assembly reaches the position preselected by the position into which the control lever has been moved. It will be understood that the carriage 508 may be shifted by the control lever into any desired position between the ends of the trackway bars 510, in addition to the two specific positions determined by the collars 524 and 526, and that it will be retained in any such other position by frictional engagement of the brake block 520 with the adjacent bar 510.

From the foregoing description it will be realized that the operation of the tong assembly involves the control of a total of nine distinct fluid-actuated devices—that is, the upper and lower gate operating cylinders 50 and 82, the upper and lower grip cylinders 116 and 118, the spinning roller actuating cylinders 256, 258 and 280 (which, however, are operated and controlled as a unit), the spinning motor 200, the frame-actuating cylinder 96, the horizontal swinging cylinder 382, and the vertical column 12, 14. Furthermore, each of these devices is operable in opposite directions, and the sequence of operation of the various devices and the direction of their operation varies in accordance with the tonging operation being performed—that is, whether the drill pipe tool joints are being made up or broken out. Therefore, in order to reduce to a minimum the burden of mental alertness and physical dexterity imposed on the single operator, and to avoid loss of time between sequential operations, and to minimize the possibility of improper control of the various hydraulically actuated devices, a hydraulic system has been devised which provides hydraulic interlocks between certain of the devices and provides for automatic sequential operation of certain of the devices under the control of pressure-responsive sequence valves. This hydraulic system, in conjunction with the automatic follow-up mechanisms previously described, render it possible for an operator of average intelligence and skill to operate the device properly, safely and rapidly.

In the subsequent description of the hydraulic system reference is made to various "sequence valves." This term, as universally applied in the hydraulic control art and as used herein, designates a valve having main inlet and outlet ports adapted to be interposed in a main conduit, and a branch outlet port adapted to be connected to a branch conduit. The branch outlet is normally closed, as by a spring-urged valve or the like, but is adapted to open in response to a pressure rise to a predetermined magnitude in the main conduit. Such valves are commonly employed in hydraulic systems wherein it is desired to first actuate a fluid-actuated device connected to a main conduit and thereafter automatically actuate another device connected to a branch conduit, thus effecting automatic sequential operation of the devices in a predetermined order of sequence.

Referring to Figure 27 wherein the hydraulic system is illustrated schematically, there will be observed at the right-hand side thereof a main pressure fluid supply line 600 and a main return line 602, both adapted to be connected to a source of fluid supply, not shown. The valve 388 which has been described as being controlled by the horizontal swinging follow-up mechanism and which controls the operation of the cylinder 382 and its piston 380, is connected to the main supply and return lines by conduits 395 and 397 respectively. The three-way valve 500 which, as described above, is controlled by the vertical follow-up mechanism and in turn controls the raising and lowering of the column section 12, is connected to the lines 600 and 602 by conduits 501 and 503 respectively. Relief valves 398 and 400 are interposed in the conduits 394 and 396 connecting the valve 388 with opposite ends of the cylinder 382, and a relief valve 469 is interposed in the conduit 468 connecting the valve 500 with the cylinder 470 in the column section 12. These relief valves are adapted to open and establish communication between the respective conduits and a common return conduit 604 connected to the main return line 602, in the event of an excessive pressure rise in the respective conduits caused by the momentum of the moving parts when the control valves are closed.

It has been found possible to control the operation of the lower gate cylinder 82 and the lower grip cylinder 118 by a common control valve 606, which is connected to the main lines 600, 602 by conduits 607, 608. Accordingly, the conduits 175 and 185 leading to the main cylinder of the lower grip cylinder assembly 118 are connected respectively to the conduits 73 and 71 which connect the opposite ends of the lower gate cylinder 82 with the valve 606. In order to insure full closing and latching of the lower gate 78 prior to advancing the lower jaw frame 114 by admission of fluid to the grip cylinder 118 a sequence valve 610 is interposed between the conduits 73 and 175, the valve being adapted to admit pressure fluid to conduit 175 when the pressure in conduit 73 reaches a predetermined value upon closing of the gate 78. A pressure reducing or regulating valve 612 may, if desired, be interposed in conduit 175 and may be manually adjusted to maintain the maximum pressure to which the cylinder 118 is subjected at a predetermined value less than the system pressure in line 600. This permits regulation of the gripping force applied to the tool joints independently of the torque applied thereto by the frame actuating cylinder 96.

It is desirable under certain circumstances to operate the upper gate cylinder 50 independently of the upper grip cylinder, and hence separate control valves 614 and 616 are provided for these two devices. The valve 614 is connected to the main lines 600, 602 by conduits 617 and 618 respectively, and is connected to opposite ends of the upper gate cylinder 50 by conduits 70 and 72.

The spinning roller actuating cylinders are controlled by a valve 620 to which the common supply and return lines 299 and 300 leading from the manifold 298 (Figure 4) are connected. The valve stem and control handle 621 of this valve are biased to the right, as indicated schematically by spring 622 in Figure 27, in which position the main supply line 600 communicates with the conduit 300, thus normally holding the rollers in their retracted, inoperative positions. The operation of the spinning motor 200 is also controlled by the valve 620, and in order that the motor may be operated only while the rollers are advanced into operative positions, a sequence valve 624 is interposed in the conduit 299 and opens upon a predetermined pressure rise in conduit 299 to permit pressure fluid to flow to the motor through a conduit 626, another sequence valve 628, a conduit 629, and a reversing valve 630. When making up the joints the valve control lever 631 is disposed in the position designated "In," thereby admitting pressure fluid to the motor through conduit 632 to cause the motor to drive the rollers in counterclockwise direction. Fluid is exhausted from the motor through conduit 633, valve 630 and return conduit 634 connected to the main return line 602. When breaking and spinning out the joints, the control lever 631 is disposed in the dotted line position designated "Out," to admit pressure fluid to the motor through conduit 633 and drive the motor in the reverse direction.

A flow control valve 635 may be interposed in the conduit 633 to regulate the speed of the motor during the spinning-out operation.

In conditioning the apparatus for the spinning operation it has been found most expedient to first close the upper gate 32, then fully advance the rollers while the jaw frame 112 is retracted, then apply relatively low pressure to the grip cylinder 116 to advance the jaw frame and the rollers carried thereby, the pressure applied to the cylinder 116 being only sufficient to urge the rollers against the pipe with force sufficient to prevent their slipping on the pipe. It will be understood that this force is transmitted from the jaw frame to the rollers through the pressure fluid in the roller actuating cylinders, and hence if an excessive pressure were applied to the grip cylinder, such as that used when gripping the joint directly by the jaw faces 36 and 110, the rollers would be forced outwardly in retracting direction and the jaw faces would contact the joint and prevent spinning thereof by the rollers.

In order to avoid the aforementioned condition, the actuation of the grip cylinder during the spinning operation is controlled by the valve 620 independently of the valve 616 which controls its operation when gripping the joint. The conduit 626, which as stated previously is connected to the conduit 299 through the sequence valve 624, leads to the grip cylinder 116, and is connected in parallel with the low pressure conduit 174. A pressure reducing valve 636 is interposed in the conduit 626 to permit regulation of the pressure to the desired low value as pointed out above. A check valve 637 in this conduit prevents reverse flow therethrough when the cylinder is subjected to high pressure for gripping the joint. The purpose of the sequence valve 628 between the conduits 626 and 629 is to prevent actuation of the spinning motor until the pressure in conduit 626 reaches a predetermined value, which occurs when the rollers have been advanced by the grip cylinder 116 into contact with the pipe. As stated previously, it is desired to insure that the gate 32 is fully closed and latched before the rollers are advanced, and to insure this a pilot control valve 638 is interposed in the main supply line 600 in advance of the valve 620 and is connected by a conduit 639 to the conduit 72 connecting the valve 614 with the upper gate cylinder 50. The pilot valve 638 prevents flow of pressure fluid to the valve 620 until a predetermined pressure prevails in conduit 639, which occurs only after the gate 32 is closed.

The valve 616 is used to control the actuation of the upper grip cylinder 116 to cause the jaw faces 36 and 110 to grip the joint and effect either the final make-up or the initial breakout upon oscillation of the tong structures A and B by the frame actuating cylinder 96 and its piston rod 102. As in the case of the valve 620, the valve stem and control handle 640 of the valve 616 are biased in a direction to place the conduit 184 in communication with the pressure fluid supply conduit 641 connecting the valve 616 with the conduit 300, and establishing communication between the conduit 172 and the return conduit 642. The main piston 124 of the grip cylinder assembly 116 is thus normally retracted, and after having been advanced it automatically returns to its retracted position upon release of the control handle 640. It will be understood that upon closing the upper gate 32 the pilot valve admits pressure fluid to the valve 620 which, in its normal biased position as shown, admits pressure fluid to conduit 300 and therefore to conduit 641. The connection of the conduit 641 to the conduit 300 instead of to the main supply line 600 in advance of the valve 620 is to provide an interlock preventing high pressure operation of the grip cylinder 116 under control of the valve 616, during the spinning operation. This interlock is effected by the fact that when the valve 620 is shifted to actuate the roller actuating cylinders and the motor 200, the conduit 300 and consequently the conduit 641 are connected to the main return line 602, thereby rendering valve 616 ineffective.

The operation of the grip cylinder assembly 116, and the manner in which the pressure is intensified by the booster piston upon functioning of the sequence valve 194, have been fully described hereinabove and further description thereof is deemed unnecessary except to point out that a pressure reducing and regulating valve 644 may be interposed in the conduit 174 to permit regulation of the gripping pressure as previously mentioned in connection with the lower grip cylinder 118 and the reducing valve 612.

It is desirable to operate the frame actuating cylinder 96 in sequence with actuation of the upper grip cylinder, and therefore the conduits 106 and 108 leading to the cylinder 96 are connected to the grip cylinder conduits 184 and 174 respectively through a reversing valve 646, conduits 107 and 109 and sequence valves 648 and 650. When the grip cylinder 116 is fully retracted the pressure in conduit 184 causes the sequence valve 648 to admit pressure fluid through conduit 107 to the valve 646, and, depending on the setting of this valve, to one end or the other of the cylinder 96. The stem of the valve 646 is connected to that of the valve 630 for actuation in unison therewith by the common control handle 631. When making up the joints the handle 631 is, as previously described, disposed in the position designated "IN," which establishes communication between the normally pressurized conduit 184 and the conduit 106 leading to the outer end of the cylinder 96. Hence with the valve 616 in its normal biased position as shown, the piston rod 102 is fully extended and the tong structures A and B are in the relative positions shown in Figure 2, in readiness for a joint make-up tonging operation.

When the operator shifts the valve operating handle 640 to the left, the grip cylinder 116 is first actuated to advance the jaw frame 112, and when the pipe joint is gripped the pressure rise in conduit 174 (which is at that time pressurized) causes the sequence valve 650 to admit pressure fluid through conduit 109 and valve 646 to conduit 108 to retract the piston rod 102 and thus swing the upper tong structure A clockwise, and thereby making up the joint. Upon release of the operating handle it returns to its normal biased position, causing the grip cylinder to retract. Upon full retraction thereof, the sequence valve 648 admits pressure to conduit 107, valve 646 and conduit 106, thereby returning the upper tong structure to its initial position in readiness for another operation.

It will be understood that the operating handle 631 controlling both reversing valves 630 and 646 is maintained in its "In" position throughout the entire operation of running the drill string into the well, and is shifted to the "Out" position and maintained in that position throughout the operation of pulling the drill string. In the latter case the conduit 108 is normally in communication with the grip cylinder return conduit 184 which is pressurized upon closing the gate 32, and hence the piston rod 102 is normally retracted and the tong structure A is normally maintained in readiness for counterclockwise swinging to break out the joints. It will be observed that a pressure reducing and regulating valve 652 is interposed in the conduit 108, whereby the make-up torque applied to the tool joints may be regulated. A check valve 654 is provided in a by-pass line 656 around the valve 652, to permit unregulated return flow through the conduit 108 during breaking-out operations.

It will be apparent from the foregoing description of the hydraulic system including the various hydraulically actuated devices, their control valves, and the various interlocks and sequencing devices, that the number of manual manipulations for any given cycle of operations is reduced to that which can be conveniently performed by a single operator. It will be understood that the manually operated valves 606, 614, 616, 620, 630 and 646 are all located within the control panel with their operating handles projecting through the walls of the panel in positions convenient to the operator.

As an illustration of the simplicity of control of the entire device, the following example of a complete cycle is given: Assume that the tong assembly is in the laterally offset position shown in Figure 1, but with the upper gate 32 as well as the lower gate 78 in open position, and the drill string is being run into the well. As a stand of pipe is moved from the pipe rack and stabbed into the tool joint at the upper end of the drill string, the operator rotates the control lever 444 of the swinging follow-up mechanism to a predetermined position which will automatically arrest swinging movement of the arm C and the tongs when the tongs reach a position wherein closing of the gates about the tool joint is just possible. If the tongs are not at the proper elevation, the vertical follow-up control lever 514 is manipulated to align each tong with its respective tool joint section. In the meantime the operator will have shifted the control handles of both gate cylinder valves 606 and 614 to cause the gates to close and also to cause the lower jaw frame 114 to advance and grip the lower tool joint section. The control handle 621 of the valve 620 is then shifted, resulting first in the advancement of the rollers by their actuating cylinders 256, 258 and 280, followed automatically by the advancement of the jaw frame 112 by the grip cylinder 116 at relatively low spinning pressure, which in turn is followed automatically by the actuation of the spinning motor 200. The operator maintains the valve 620 in shifted position until the spinning operation is completed, whereupon he releases the control handle 621 and shifts the control handle 640 of the grip cylinder valve 616. This applies high pressure to the grip cylinder to cause the jaw frame to grip the upper joint, the rollers having been retracted and the motor 200 having stopped upon shifting of the valve 620 when the control handle 621 was released. As soon as the jaw frame 112 grips the tool joint the frame actuating cylinder 96 is automatically actuated by functioning of the sequence valve 650, to swing the upper tong structure A in joint make-up direction. If a single stroke of the frame actuating piston rod 102 should be insufficient to make the joint up tightly, the operator merely shifts the control handle 640 to its normal position momentarily to return the piston rod 102 to its initial position and then shifts the handle 640 again to repeat the tonging operation.

Upon completion of the tonging operation the operator releases the handle 640, allowing it to return to its normal biased position which causes retraction of the grip cylinder 116 and jaw frame 112 and also conditions the cylinder 96 and piston rod 102 for the next operation. Upon shifting of the valves 606 and 614 gates are opened and the lower grip cylinder 118 and jaw frame 114 are retracted. The swinging follow-up control lever 444 is then rotated to a selected position which actuates the swing cylinder 382 to swing the tong assembly to an offset predetermined position.

While there has been described what is at present considered to be a preferred embodiment of the present invention, it will be apparent to those skilled in the art that various modifications and changes may be made without departing from the essence of the invention, and it is intended to cover all such modifications and changes as are within the true scope and spirit of the appended claims.

We claim:

1. A combined pipe spinning, make-up and break-out tong comprising: a main frame; relatively movable pipe-gripping jaws carried thereby and defining therebetween a pipe recess, at least one of said jaws having an opening in the jaw face thereof; a roller frame pivotally supported in said main frame adjacent said opening; a motor carried by said main frame for swinging said roller frame about its pivot; a roller journaled on said roller frame and adapted to be moved, upon swinging of said roller frame about its pivot, between an operative position wherein it projects thru said opening into said pipe recess and a retracted position outside said pipe recess; and a motor carried by said main frame for rotating said roller.

2. A combined pipe spinning, make-up and break-out tong comprising: a main frame; relatively movable pipe-gripping jaws carried thereby and defining therebetween a pipe recess, each of said jaws having an opening in the jaw face thereof; roller frames pivotally supported in said main frame adjacent said openings; power actuated devices carried by said main frame for swinging said roller frames about their respective pivots; a roller journaled on each of said roller frames and adapted to be moved, upon swinging of its respective roller frame about its pivot, between an operative position wherein it projects thru said opening into said pipe recess and a retracted position outside said pipe recess; and a motor carried by said frame for rotating at least one of said rollers.

3. A combined spinning, make-up and break-out tong comprising: a main frame; relatively movable jaw frames carried by said main frame, said jaw frames having opposed jaw faces defining a pipe recess therebetween, each jaw face having an opening therein, at least one of said jaw frames being movable relative to said main frame toward and away from the other jaw frame to vary the size of said pipe recess; a roller frame pivotally mounted on each jaw frame adjacent the opening therein; power-actuated devices operatively connected to said roller frames to swing them about their respective pivots; a roller journaled on each roller frame and adapted, upon pivotal movement of its respective roller frame, to be moved between an operative position wherein it projects through a respective opening into said pipe recess and a retracted position outside said pipe recess; and a motor for rotating at least one of said rollers.

4. A pipe tong as set forth in claim 3, wherein a plurality of roller frames are pivotally mounted in one of said jaw frames, each roller frame having a roller journaled thereon, said rollers being adapted to be projected and withdrawn through the opening in the jaw face of said one jaw frame upon pivotal movement of said roller frames.

5. A combined spinning, make-up and break-out tong comprising: a main frame; a gate pivotally mounted thereon; a jaw face on said gate; a jaw frame carried by said main frame and having a jaw face thereon opposing the jaw face on said gate and defining therebetween a pipe recess, said jaw frame being movable toward and away from said gate to vary the size of said pipe recess; a pair of roller frames pivotally mounted on said jaw frame, and a roller journaled on each roller frame; a roller frame pivotally mounted on said gate and having a roller journaled thereon; power-actuated devices operatively connected to said roller frames for swinging them about their respective pivots; each of said jaw faces having an opening therein through which said rollers are adapted to be projected and withdrawn upon pivotal movement of their respective roller frames; and a motor for rotating at least one of said rollers.

6. A combined spinning, make-up and break-out tong comprising: a main frame; relatively movable jaw frames carried by said main frame, said jaw frames having opposed jaw faces defining a pipe recess therebetween; a roller frame pivotally mounted on each of said jaw frames, power actuated devices operatively connected respectively to each of said roller frames and to said jaw frames to swing them about their respective pivots; a roller carried by each roller frame and adapted to be moved into and out of engagement with a pipe disposed in said recess upon pivotal movement of its roller frame; and a fluid motor for rotating at least one of said rollers.

7. A pipe tong as set forth in claim 6, and including a main conduit connecting said control valve with said roller frame actuating devices, a branch conduit connecting said motor with said main conduit, and a sequence valve interposed between said branch conduit and said main conduit, said valve being normally closed but adapted to open to admit pressure fluid to said branch conduit in response to predetermined pressure in said main conduit, whereby said roller frame actuating devices and said motor are actuated in predetermined sequence.

8. A pipe tong as set forth in claim 6, and including a fluid-actuated device operatively connected to one of said jaw frames and to said main frame for moving said one jaw frame toward and away from the other jaw frame, a main conduit connecting said control valve with said roller frame actuating devices, branch conduits connecting said motor and said jaw frame actuating device with said main conduit, and a sequence valve interposed between said branch conduits and said main conduit and operable in response to predetermined pressure in said main conduit to admit pressure fluid to said branch conduits, whereby said motor may be energized and said one jaw frame may be advanced only subsequent to projection of said rollers into the pipe recess.

9. A pipe tong as set forth in claim 6, and including a fluid-actuated device operatively connected to one of said jaw frames and to said main frame for moving said one jaw frame toward and away from the other jaw frame, a main conduit connecting said control valve with said roller frame actuating devices, a first branch conduit connecting said jaw frame actuating device with said main conduit, a first sequence valve interposed between said conduits and operable responsive to predetermined pressure in said main conduit to admit pressure fluid to said first branch conduit, a second branch conduit connecting said motor with said first branch conduit, and a second sequence valve interposed between said branch conduits and operable responsive to predetermined pressure in said first branch conduit to admit pressure fluid to said second branch conduit, whereby upon manipulation of said control valve said roller frames are advanced, said jaw frame is advanced and said motor is energized in sequence in the order named.

10. A pipe tong comprising: a frame member; a gate member pivotally mounted thereon; pipe-gripping jaws carried by said frame and gate members; a latch pivotally mounted on one of said members and adapted to releasably engage a cooperating latch lug on the other member to releasably hold the gate member in closed position; and a single fluid-actuated device mounted on one of said members and operatively connected to the other of said members and to said latch, said device being operable to effect pivotal movement of both said gate member and said latch about their respective pivots.

11. A pipe tong comprising: a frame member; a gate member pivotally mounted thereon; pipe-gripping jaws carried by said frame and gate members; a latch pivotally mounted on one of said members and adapted to releasably engage a cooperating latch lug on the other member to releasably hold the gate member in closed position; a fluid-actuated device comprising cylinder and piston elements, one of said elements being mounted on said frame member and the other element being operatively connected to said latch to swing the same about its pivot, and abutments on said latch and on the member on which it is mounted, said abutments being interengageable to limit pivotal movement of said latch, whereby upon actuation of said fluid-actuated device said latch is swung about its pivot and upon interengagement of said abutments said gate is swung about its pivot.

12. A pipe tong comprising: a frame member; a gate member pivotally mounted thereon; pipe-gripping jaws carried by said frame and gate members; a first fluid-actuated device interconnected between said frame and gate members for swinging said gate about its pivot; a second fluid-actuated device engaging one of said jaws for moving the same toward and away from pipe-gripping position; a first conduit connecting said first fluid-actuated device with a source of pressure fluid; a second conduit connecting said second fluid-actuated device with said first conduit; and a valve normally closing said second conduit, said valve being adapted to open responsive to predetermined pressure in said first conduit.

13. A pipe tong comprising: a frame; pipe-gripping jaws mounted on said frame; at least one of said jaws being movable relative to said frame into and out of pipe-gripping position; a pipe-spinning element carried by said movable jaw and movable relative to said jaw into and out of pipe-engaging position; a first power-actuated device interengaging said jaw and said spinning element for advancing and retracting said pipe-spinning element; a second power-actuated device interengaging said frame and jaw for advancing and retracting said movable jaw; a motor for actuating said pipe-spinning element to spin the pipe; a first control member controlling energization of said first power-actuated device; a second control member; and means to actuate said second control member for energizing said motor upon movement of said pipe spinning element into pipe engaging position.

14. A pipe tong as set forth in claim 13, including a second frame and jaw assembly movable with respect to said first mentioned jaw and frame, a third power actuated device for moving said second frame relative to said first mentioned frame, and a third control member to energize said third power actuated device; and means responsive to energization of said second power-actuated device in advancing direction to energize the third control member.

15. A pipe tong comprising: a frame; pipe-gripping jaws mounted on said frame; at least one of said jaws being movable relative to said frame into and out of pipe-gripping position; a pipe-spinning element carried by said movable jaw and movable relative to said jaw into and out of pipe-engaging position; a first fluid-actuated device for advancing and retracting said pipe-spinning element; a second fluid-actuated device for advancing and retracting said movable jaw; a fluid motor for actuating said pipe-spinning element to spin the pipe; a first control valve controlling energization of said first fluid-actuated device; a second control valve and means to actuate said second control valve for energizing said motor upon movement of said pipe spinning element into pipe engaging position.

16. A pipe tong as set forth in claim 15 including a second frame and jaw assembly movable with respect to said first mentioned jaw and frame, a third power actuated device for moving said second frame relative to said first mentioned frame, and a third control valve to energize said third power actuated device; and means responsive to energization of said second fluid-actuated device in advancing direction to energize the third control valve.

17. A pipe tong assembly comprising: upper and lower tong structures, each comprising a fixed pipe-gripping jaw and a jaw movable longitudinally of the tong structure toward and away from said fixed jaw whereby to accommodate different sizes of pipe joints and whereby the location of the pipe joint axis varies longitudinally of the tong structure with different sized pipe joints; power-actuated means interconnecting said tong structures and operable to effect relative oscillation thereof about the axis of a pipe joint gripped between said jaws; and interlocking elements on the respective tong structures disposed at laterally opposite sides of the pipe recess between the jaws, said elements extending substantially longitudinally of the tong structures and restraining relative lateral movement therebetween and permitting relative oscillation thereof and relative longitudinal movement therebetween.

18. A pipe tong assembly as set forth in claim 17, and including transversely extending interlocking elements on the respective tong structures restraining relative longitudinal movement therebetween, one of said last-named elements being yieldable longitudinally relative to its tong structure to permit limited relative longitudinal movement between the tong structures incident to relative oscillation therebetween about different longitudinally spaced axes.

19. A pipe tong assembly as set forth in claim 17, and including means on one tong structure forming a transverse arcuate track member substantially concentric with a median sized pipe joint gripped by said jaws; a track-engaging member on the other tong structure adapted to traverse said track member during relative oscillation between said tong structures, said members cooperating to restrain relative longitudinal movement between said tong structures; one of said members being yieldably connected to its tong structure to permit limited relative longitudinal movement between said tong structures.

20. A pipe tong assembly as set forth in claim 17, and including means on one tong structure forming a pair of longitudinally spaced transverse arcuate trackways substantially concentric with a median sized pipe joint gripped by said jaws; a lever pivotally mounted on the other tong structure and carrying a roller disposed between said trackways; and force-applying members yieldably resisting pivotal movement of said lever in either direction to thereby resist relative longitudinal movement between said tong structures.

21. A pipe tong comprising: a frame; relatively movable pipe-gripping jaws carried by said frame; a main cylinder member and a main piston member, one of said members being connected to said frame and the other member being connected to one of said jaws; an auxiliary cylinder fixed to said main piston member; an auxiliary piston in said auxiliary cylinder; a first conduit communicating the interior of said main cylinder member with a source of fluid under pressure; a second conduit communicating the interior of said auxiliary cylinder with said source; and a valve normally closing said second conduit, said valve being adapted to open responsive to predetermined fluid pressure in said first conduit.

22. A pipe tong comprising: a frame; relatively movable pipe-gripping jaws carried by said frame; a main cylinder member and a main piston member, one of said members being connected to said frame and the other member being connected to one of said jaws; an auxiliary cylinder fixed to said main piston member; a differential piston having a relatively large diameter piston area exposed to the pressure of fluid in said auxiliary cylinder and having a relatively small diameter piston area exposed to the pressure of fluid in said main cylinder member; a first conduit communicating the interior of said main cylinder member with a source of fluid under pressure; a second conduit communicating the interior of said auxiliary cylinder with said source; and a valve normally closing said second conduit, said valve being adapted to open responsive to predetermined fluid pressure in said first conduit.

23. A pipe tong comprising: a frame; relatively movable pipe-gripping jaws carried by said frame; a main cylinder member and a main piston member, one of said members being connected to said frame and the other member being connected to one of said jaws; an auxiliary cylinder fixed to said main piston member; an auxiliary piston in said auxiliary cylinder; a first conduit communicating the interior of said main cylinder member with a source of fluid under pressure; a second conduit communicating the interior of said auxiliary cylinder with said source; a valve normally closing said second conduit and adapted to open responsive to predetermined fluid pressure in said first conduit; and a unidirectional valve in said first conduit preventing fluid flow therethrough from said main cylinder member toward said source.

24. A pipe tong comprising: a frame; relatively movable pipe-gripping jaws carried by said frame; a main cylinder member and a main piston member, one of said members being connected to said frame and the other member being connected to one of said jaws; an auxiliary cylinder fixed to said main piston member; an auxiliary piston in said auxiliary cylinder; a first conduit communicating the interior of said main cylinder member with a source of fluid under pressure; a second conduit communicating the interior of said auxiliary cylinder with said source; a valve normally closing said second conduit and adapted to open responsive to predetermined fluid pressure in said first conduit; and a unidirectional valve in said second conduit between said auxiliary cylinder and said first-mentioned valve, said unidirectional valve preventing fluid flow from said auxiliary cylinder toward said first-mentioned valve.

25. A pipe tong comprising: a frame; relatively movable pipe-gripping jaws carried by said frame; a main cylinder member and a main piston member, one of said members being connected to said frame and the other member being connected to one of said jaws; an auxiliary cylinder fixed to said main piston member; an auxiliary piston in said auxiliary cylinder; a first conduit communicating the interior of said main cylinder member with a source of fluid under pressure; a second conduit communicating the interior of said auxiliary cylinder with said source; a third conduit communicating the interior of said auxiliary cylinder with the interior of said main cylinder member; a valve normally closing said second conduit and adapted to open responsive to predetermined fluid pressure in said first conduit; and a unidirectional valve in said third conduit normally preventing fluid flow therethrough toward said auxiliary cylinder.

26. A pipe tong comprising: a frame; relatively movable pipe-gripping jaws carried by said frame; a main cylinder member and a main piston member, one of said members being connected to said frame and the other member being connected to one of said jaws; an auxiliary cylinder fixed to said main piston member; an auxiliary piston in said auxiliary cylinder; a first conduit communicating the interior of said main cylinder member with a source of fluid under pressure; a second conduit communicating the interior of said auxiliary cylinder with said source; a third conduit communicating the interior of said auxiliary cylinder with the interior of said main cylinder member; a valve normally closing said second conduit and adapted to open responsive to predetermined fluid pressure in said first conduit; a unidirectional valve in said third conduit normally preventing fluid flow therethrough toward said auxiliary conduit; and a valve actuator carried by said unidirectional valve and operable to maintain said unidirectional valve in open position during a predetermined range of positions of said auxiliary piston.

27. A pipe tong comprising: a frame; relatively movable pipe-gripping jaws carried by said frame; a main cylinder member and a main piston member, one of said members being connected to said frame and the other member being connected to one of said jaws; an auxiliary cylinder fixed to said main piston member; a differential piston having a relatively large diameter piston area exposed to the pressure of fluid in said auxiliary cylinder and having a relatively small diameter piston area exposed to the pressure of fluid in said main cylinder member; a first conduit communicating the interior of said main cylinder member with a source of fluid under pressure; a second conduit communicating the interior of said auxiliary cylinder with said source; a third conduit extending through said differential piston and communicating the interior of said main cylinder member with the interior of said auxiliary cylinder; a unidirectional valve in said third conduit normally preventing flow therethrough toward said auxiliary cylinder, said valve having an actuator operable to maintain said valve in open position during a predetermined range of positions of said differential piston; a unidirectional valve in said second conduit preventing escape of fluid therethrough from said auxiliary cylinder; and a valve normally closing said second conduit against fluid flow from said source to said auxiliary cylinder, said last-named valve being adapted to open responsive to predetermined pressure in said first conduit.

28. A combined pipe spinning, make-up and break-out tong comprising: a main frame; relatively movable pipe-gripping jaws carried thereby and defining therebetween a pipe recess, at least one of said jaws having an opening in the jaw face thereof; a roller frame supported in said main frame adjacent said opening; a motor carried by said main frame for moving said roller frame; a roller journaled on said roller frame and adapted to be moved with said roller frame between an operative position wherein it projects through said opening into said pipe recess and a retracted position outside said pipe recess; and a motor carried by said main frame for rotating said roller.

29. A combined pipe spinning, make-up and break-out tong comprising: a main frame; relatively movable pipe-gripping jaws carried thereby and defining therebetween a pipe recess, each of said jaws having an opening in the jaw face thereof; roller frames movably supported in said main frame adjacent said openings; power-actuated devices carried by said frame for moving said roller frames; a roller journaled on each of said roller frames and adapted to be moved between an operative position wherein it projects through said opening into said pipe recess and a retracted position outside said pipe recess; and a motor carried by said frame for rotating at least one of said rollers.

30. A combined spinning, make-up and break-out tong comprising: a main frame; relatively movable jaw frames carried by said main frame, said jaw frames having opposed jaw faces defining a pipe recess therebetween, each jaw face having an opening therein, at least one of said jaw frames being movable relative to said main frame toward and away from the other jaw frame to vary the size of said pipe recess; a roller frame movably mounted on each jaw frame adjacent the opening therein; power-actuated devices operatively connected to said roller frames to move them; a roller journaled on each roller frame and adapted upon movement of its respective roller frame to be moved between an operative position wherein it projects through a respective opening into said pipe recess and a retracted position outside said pipe recess; and a motor for rotating at least one of said rollers.

31. A pipe tong as set forth in claim 30, wherein a plurality of roller frames are movably mounted in one of said jaw frames, each roller frame having a roller journaled thereon, said rollers being adapted to be projected and withdrawn through the opening in the jaw face of said one jaw frame upon movement of said roller frames.

References Cited in the file of this patent

UNITED STATES PATENTS

| | | |
|---|---|---|
| 439,763 | Purvis | Nov. 4, 1890 |
| 486,723 | Loss | Nov. 22, 1892 |
| 1,837,689 | Sunde | Dec. 22, 1931 |
| 1,869,445 | Tomkins | Aug. 2, 1932 |
| 1,954,920 | Damerell | Apr. 17, 1934 |
| 1,970,999 | Ferris et al. | Aug. 21, 1934 |
| 2,000,221 | Dawson | May 7, 1935 |
| 2,022,197 | Hampton | Nov. 26, 1935 |
| 2,204,112 | Abegg | June 11, 1940 |
| 2,248,836 | Wallace | July 8, 1941 |
| 2,311,225 | Grable | Feb. 16, 1943 |
| 2,351,872 | Parker | June 20, 1944 |
| 2,351,887 | Steadman | June 20, 1944 |
| 2,450,934 | Calhoun | Oct. 12, 1948 |
| 2,453,369 | Grable et al. | Nov. 9, 1948 |
| 2,477,710 | Worstell | Aug. 2, 1949 |
| 2,544,639 | Calhoun | Mar. 13, 1951 |